(12) United States Patent
Wang et al.

(10) Patent No.: US 11,144,703 B1
(45) Date of Patent: Oct. 12, 2021

(54) SMART REPEATER DESIGN FOR ON-ROUTE REPEATER PLANNING FOR BUS

(71) Applicant: Synopsys, Inc., Mountain View, CA (US)

(72) Inventors: Kai-Ping Wang, Sunnyvale, CA (US); Haiying Liu, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/700,230

(22) Filed: Dec. 2, 2019

Related U.S. Application Data

(60) Provisional application No. 62/773,503, filed on Nov. 30, 2018.

(51) Int. Cl.
| | | |
|---|---|---|
| *G06F 30/398* | (2020.01) | |
| *G06F 30/30* | (2020.01) | |
| *G06F 30/392* | (2020.01) | |

(52) U.S. Cl.
CPC ............ *G06F 30/398* (2020.01); *G06F 30/30* (2020.01); *G06F 30/392* (2020.01)

(58) Field of Classification Search
CPC ........... G06F 30/30–398; G06F 30/392; G06F 30/398
See application file for complete search history.

(56) References Cited

U.S. PATENT DOCUMENTS

| | | | |
|---|---|---|---|
| 6,532,580 B1* | 3/2003 | Josephson | G06F 30/394 |
| | | | 716/114 |
| 2009/0083689 A1* | 3/2009 | Ringe | G06F 30/394 |
| | | | 716/126 |
| 2015/0331985 A1* | 11/2015 | Sharma | G06F 30/394 |
| | | | 716/122 |
| 2016/0275230 A1* | 9/2016 | Ahluwalia | G06F 30/34 |
| 2017/0032074 A1* | 2/2017 | Song | G06F 30/394 |
| 2019/0205497 A1* | 7/2019 | Tai | G06F 30/394 |

* cited by examiner

*Primary Examiner* — Jack Chiang
*Assistant Examiner* — Aric Lin
(74) *Attorney, Agent, or Firm* — Sterne, Kessler, Goldstein & Fox P.L.L.C.

(57) ABSTRACT

A computerized system is disclosed. The computerized system may include one or more processors configured to perform the operations stored in a memory. The operations may include creating a plurality of library (lib) cells for a directional routing layer, and determining a lib cell of the plurality of lib cells for placement of at least one repeater for the directional routing layer. The operations may also include determining a route touch region corresponding to a pin region of the lib cell through which a route is going through and inserting the at least one repeater at the route touch region. The operations may also include swapping the at least one inserted repeater to at least one target lib cell of the plurality of lib cells.

20 Claims, 15 Drawing Sheets

SMART REPEATER DESIGN FOR ON-ROUTE REPEATER PLANNING FOR BUS

CROSS-REFERENCE TO RELATED APPLICATIONS

The present application claims priority under 35 U.S.C. § 119(e) to U.S. Provisional Patent Application No. 62/773,503 titled "Smart repeater design for on route repeater planning for bus" and filed on Nov. 30, 2018, which is hereby incorporated by reference in its entirety for all purposes.

COPYRIGHT NOTICE

The assignee of this patent document has no objection to the facsimile reproduction by anyone of the patent document itself, or of the patent application, as it appears in the files of the United States Patent and Trademark Office, but otherwise reserves all rights whatsoever in any included works of authorship protected by copyright.

SPECIFICATION—DISCLAIMERS

In the following Background, Summary, and Detailed Description, paragraph headings do not signify limitations. In these writings, the citation or identification of any publication signifies neither relevance nor status as prior art. Many paragraphs in this disclosure are common to multiple Synopsys patent specifications.

FIELD(S) OF TECHNOLOGY

The following information is solely for use in searching the prior art. This disclosure has significance in the field of electronics in general, including the following topics: electronic design automation, repeater planning, and routing design rule checking (DRC) violation-free.

BACKGROUND

With the advance of the technologies in Very Large Scale Integration (VLSI) circuit design, repeater planning on top level high speed connections is becoming more complex and challenging. In general, the interconnect delay increases with the square of the route length. The interconnect delay can be reduced by inserting repeaters. The problem becomes more challenging when group of high speed interconnects (nets or buses) are running with the same timing constraints. The VLSI circuit designer will need to ensure that every net (bit) in a bus to have the similar delays and reach the targeted pins at the same time. Accordingly, there is a need of a solution that reduces the interconnect delay maintaining timing requirements for different nets or buses.

SUMMARY

This Summary is a prelude to the Detailed Description. This Summary, together with the independent Claims, signifies a brief writing about at least one claimed invention (which can be a discovery, see 35 USC 100(a); and see 35 USC 100(j)), for use in commerce that is enabled by the Specification and Drawings.

The claims signify a brief description of one or more of the innovations, embodiments, and/or examples found within this disclosure.

This disclosure describes a computerized system for on-route repeater planning for bus. The computerized system may include a memory configured to store operations, and one or more processors configured to perform the operations including creating a plurality of library (lib) cells for a directional routing layer. The operations may further include determining a lib cell of the plurality of lib cells for placement of at least one repeater for the directional routing layer. The operations may also include determining a route touch region corresponding to a pin region of the lib cell, and based on a determination that a route is going through the route touch region, inserting the at least one repeater at the route touch region. The operations may further include swapping the at least one inserted repeater to at least one target lib cell of the plurality of lib cell.

This disclosure also describes a method for on-route repeater planning for bus. The method may include creating variant plurality of library (lib) cells for a directional routing layer. The method may further include determining a lib cell of the plurality of lib cells for placement of at least one repeater for the directional routing layer. The method may also include determining a route touch region corresponding to a pin region of the lib cell. The method may further include inserting the at least one repeater at the route touch region based on a determination that a route is going through the route touch region. The method may further include swapping the at least one inserted repeater to at least one target lib cell of the plurality of lib cells.

This disclosure also describes a non-transitory computer-readable device having instructions stored thereon that, when executed by at least one computing device, causes the at least one computing device to perform operations including creating variant plurality of library (lib) cells for a directional routing layer. The operations may further include determining a lib cell of the plurality of lib cells for placement of at least one repeater for the directional routing layer. The operations may further include determining a route touch region corresponding to a pin region of the lib cell. The operations may further include inserting the at least one repeater at the route touch region based on a determination that a route is going through the route touch region. The operations may further include swapping the at least one inserted repeater to at least one target lib cell of the plurality of lib cells.

This Summary does not completely signify the claimed inventions. This Summary (as well as the Abstract) neither signifies essential elements of, nor limits the scope of, the claimed inventions enabled by the Specification and Figures.

DRAWINGS

The following Detailed Description, Figures, and Claims signify the uses and advantages of the claimed inventions, and their embodiments. All of the Figures are used only to provide knowledge and understanding and do not limit the scope of the claimed inventions and their embodiments. Such Figures are not necessarily drawn to scale.

Similar components or features used in the Figures can have the same, or similar, reference signs in the form of labels (such as alphanumeric symbols, e.g., reference numerals), and can signify a similar or equivalent use. Further, various components of the same type can be distinguished by following the reference label by a dash and a second label that distinguishes among the similar components. If only the first reference label is used in the Specification, its use applies to any similar component having the same first reference label irrespective of the second reference label. A brief description of the Figures is below.

Figure 1:
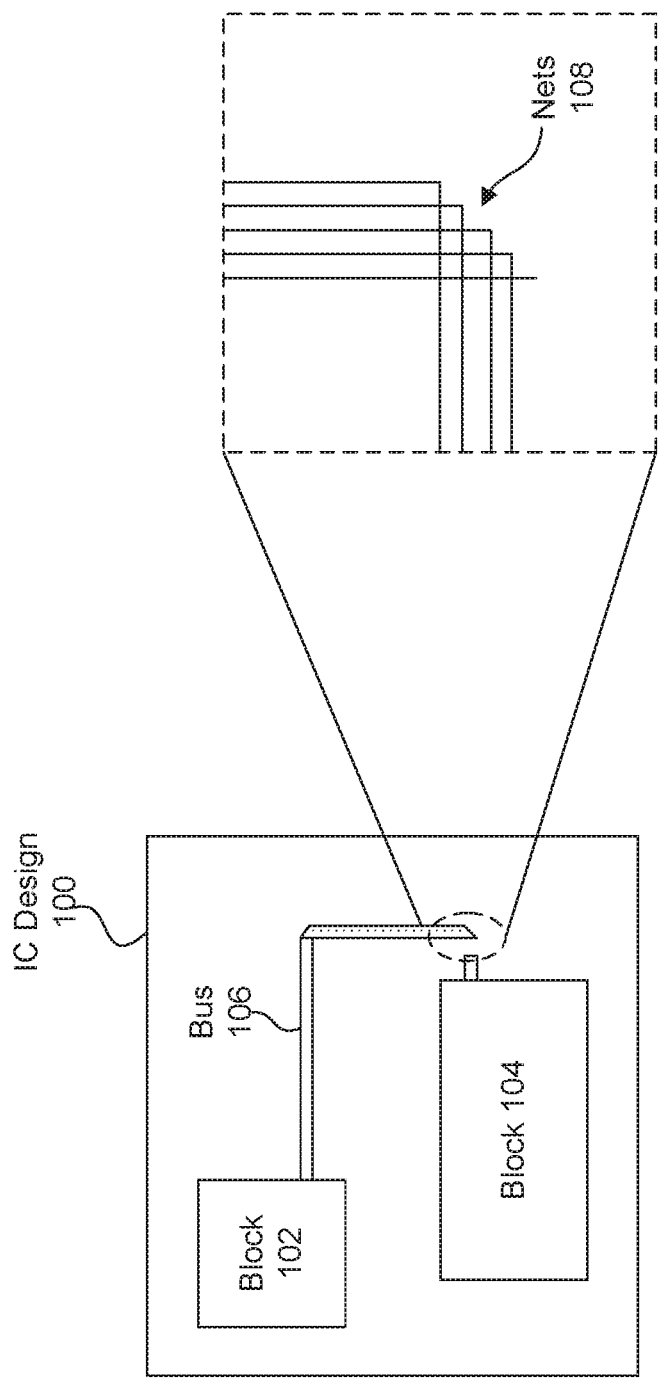
FIG. 1 illustrates a bus, according to an exemplary embodiment of the present disclosure.

In the Figures, reference signs can be omitted as is consistent with accepted engineering practice; however, a skilled person will understand that the illustrated components are readily understood when viewed in the context of the illustration as a whole and the accompanying disclosure describing such various figures.

DETAILED DESCRIPTION

The Figures and Detailed Description signify, only to provide knowledge and understanding, the claimed inventions. To minimize the length of the Detailed Description, while various features, structures or characteristics can be described together in a single embodiment, they also can be used in other embodiments without being written about. Variations of any of these elements, and modules, processes, machines, systems, manufactures or compositions disclosed by such embodiments and/or examples are easily used in commerce. The Figures and Detailed Description also can signify, implicitly or explicitly, advantages and improvements of the claimed inventions and their embodiments for use in commerce.

In the Figures and Detailed Description, numerous specific details can be described to enable at least one embodiment of the claimed inventions. Any embodiment disclosed herein signifies a tangible form of a claim invention. To not obscure the significance of the embodiments and/or examples in this Detailed Description, some elements that are known to a skilled person can be combined together for presentation and for illustration purposes and not be described in detail. To not obscure the significance of these embodiments and/or examples, some well-known processes, machines, systems, manufactures or compositions are not written about in detail. However, a skilled person can use these embodiments and/or examples in commerce without these specific details or their equivalents. Thus, the Detailed Description focuses on enabling the distinctive elements of the claimed inventions and exemplary embodiments. Where this Detailed Description refers to some elements in the singular tense, more than one element can be depicted in the Figures and like elements are labeled with like numerals.

DETAILED DESCRIPTION—VLSI CIRCUIT DESIGN AND REPEATER PLANNING

An IC design and manufacturing process produces IC chips. IC design software tools can be used to create an IC design. Once the IC design is finalized, it can undergo fabrication, packaging, and assembly to produce IC chips. The overall IC design and manufacturing process can involve multiple entities, e.g., one company may create the software for designing ICs, another company may use the software to create the IC design, and yet another company may manufacture IC chips based on the IC design. An IC design flow can include multiple steps, and each step can involve using one or more IC design software tools. An improvement to one or more of these steps in the IC design flow results in an improvement to the overall IC design and manufacturing process. Specifically, the improved IC design and manufacturing process can produce IC chips with a shorter time-to-market (TTM) and/or higher quality of results.

As an IC design progresses through an IC design flow, the IC design can be represented at different levels of abstraction by using different data formats or languages. In general, higher levels of abstraction contain fewer details of the IC design than lower levels of abstraction. Typically, the IC design is described at a high level of abstraction in the early stages of the IC design flow, and the level of abstraction becomes progressively lower as the IC design moves through the IC design flow (i.e., the description of the IC design becomes more specific as the IC design progresses through the IC design flow).

For example, toward the beginning of the IC design flow, an IC design can be described at a high level of abstraction by using a hardware description language (HDL) which describes the functionality of the IC design but does not include information about the actual geometric shapes that will be printed on the wafer. Toward the end of the IC design flow, the same IC design can be represented in a low level of abstraction by using a data format or language such as GDSII or OASIS, which contains a description of the actual geometric shapes that are to be printed on the wafer. In between these two ends of the IC design flow, the IC design may be represented in numerous data formats or languages that describe the same IC design at different levels of abstraction.

Some examples of IC design steps and the associated software tools are described below. These examples are for illustrative purposes only and are not intended to limit the embodiments to the forms disclosed. This disclosure describes techniques and systems that can be used in one or more IC design steps.

IC design software tools enable IC designers to describe the functionality that the IC designers want to implement. These tools also enable IC designers to perform what-if planning to refine functionality, check costs, etc. During logic design and functional verification, the HDL, e.g., System Verilog, code can be written and the design can be checked for functional accuracy, e.g., the design can be checked to ensure that it produces the correct outputs.

During synthesis and design for test, the HDL code can be translated to a netlist using one or more IC design software tools. Further, the netlist can be optimized for the target technology, and tests can be designed and implemented to check the finished chips. During netlist verification, the netlist can be checked for compliance with timing constraints and for correspondence (i.e., equivalence checking) with the RTL design and/or HDL code.

During design planning, an overall floorplan for the chip can be constructed and analyzed for timing and top-level routing. During physical implementation, circuit elements can be positioned in the layout and can be electrically connected.

During analysis and extraction, the IC design's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped out" to produce masks which are used during fabrication.

As mentioned above, repeater planning can be very challenging when a group of high-speed interconnects (buses) have the same timing constraints. The timing constraints can be viewed as distance/location constraints and equal routing length constraints for purposes of repeater insertion. In existing approaches, repeaters can be moved far away from their targeted locations after legalization. Specifically, repeaters that are inserted on different nets belonging to the same bus often must be placed with same distance or location constraints. This typically leads to overlapping repeaters (one repeater per bit of the bus) being inserted in substantially the same area/location. A common solution that is used in existing approaches is to use a detailed placement engine (in particular, the cell legalization step during placement) to remove the overlap among the repeaters. In this solution, when there are many repeaters clumped together, a repeater may be moved far away from the target location, which can violate the desired distance or location constraints.

Additionally, routing detours can lead to distance 5 differences among repeaters that are located in the same area. Specifically, when repeaters are located within a small area after legalization (i.e., assuming that the repeater movements are small so that the repeaters are not moved far from each other), the router may still need to detour a lot of routes to ensure that the routing is clean, i.e., it is free of any design rule violations. In particular, to obtain short routes to a pin, the router usually needs more space to go around pins of the repeaters. In other words, it is not sufficient to merely have legal cell placement with abutting repeaters; more space between adjacent repeater cells is typically needed to ensure clean routing. One solution is to use a predefined repeater pattern or a repeater bank with fixed spacing between adjacent cells. This solution can work reasonably well for nets in a bus that have regular width and spacing. However, for nets without regular width and spacing, this existing approach that uses predefined repeater patterns does not provide a satisfactory solution.

Additionally, repeater insertion is also challenging due to complicated bus route interactions among multiple buses. In particular, when multiple buses are routed together by either interleaving the routes or using different layers, repeaters for different buses could be routed in the same area. This can create additional challenges for repeater planning. In some cases, this problem can be solved by using custom repeater banks (array of repeaters with special connection pattern); however, it may be difficult, if not impossible, to create a solution that works across different IC designs.

In some embodiments, regions of snapping grid are defined such that repeaters can only be placed in the predefined snapping grid units. The size of the snapping grid unit can be computed based on route touch regions of repeaters. A route touch region of a repeater is a region that forms the basic snapping grid unit. If a route touches the route touch region, the repeater on that route will be assigned to that row or column of the snapping grid. In general, the route touch region is the same size as the repeater cell. For routes that have special routing needs, the route touch region can be smaller than the repeater cells. To make sure that the final repeater location meets the cell placement rules, the snapping grid can be aligned with the placement sites.

When a repeater location is identified on a route, the closest available grid location along the route can be determined and the repeater can be swapped to the determined grid location. Due to the grid snapping, the repeater is placed on the route in a manner that satisfies distance and location constraints. Similarly, when a new repeater is added for another net in the same or different bus, only non-occupied and non-blocked grid locations are used for placing the new repeater. In this way, all repeaters can be snapped into no-overlapping locations on the snapping grid.

Since the location of the repeater is determined one at a time, repeaters inserted for interleaving bus and overlapping buses are automatically inserted at legal and clean routing locations. Moreover, for nets with irregular width and spacing within buses, the repeaters are snapped into the grid based on the routes of the nets (thereby automatically taking into account the uneven spacing between the nets), thereby eliminating the problems caused in existing techniques by irregular width and spacing in buses.

When adding repeaters, the IC designer often knows how much space is needed to ensure routing with no detours. In some embodiments, the spacing needed between adjacent repeaters may be specified and the grid size can also be computed. Repeaters may not be allowed to be placed into certain grid locations known as blocked grid locations. The router can use the area of the blocked grid regions to perform clean, i.e., design rule checking (DRC) violation free routing.

FIG. 1 illustrates a bus in accordance with some embodiments. IC design 100 can include circuit blocks 102 and 104 that are interconnected by bus 106, which can comprise multiple nets 108, wherein each net interconnects a terminal on circuit block 102 with a terminal on circuit block 104. An initial routing can be performed on bus 106 as shown in FIG. 1. Repeaters can be inserted and placed on the nets of bus 106, and then the rest of the nets in IC design can be routed by using a router.

Specifically, given a design with interconnect buses routed, e.g., IC design 100 in FIG. 1, a group of repeaters can be added to the routed interconnect buses. The routes of the nets in the buses can be traced to determine where repeaters can be added. After an initial location of the new repeater is identified, the repeater may be swapped to its final target location. Thus, at a high level insertion of repeaters requires creating snapping patterns, defining snapping regions, and inserting or snapping repeaters. A snapping pattern describes feasible grid regions where repeaters can be placed and blocked grid regions where repeaters cannot be placed. A snapping region defines where repeaters can be placed and snapped in the snapping pattern. In the snapping repeaters step, repeaters are inserted on-route and snapped to the closest feasible grid location.

Figure 2A:
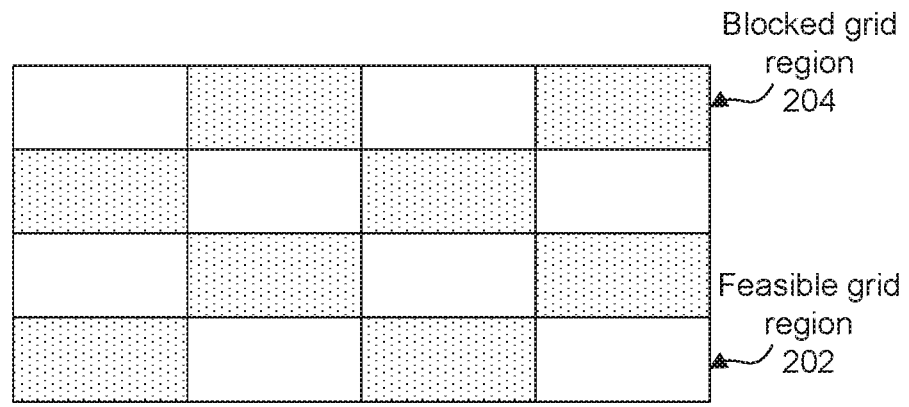
FIG. 2A and FIG. 2B illustrate snapping pattern, according to an exemplary embodiment of the present disclosure.
Figure 2B:
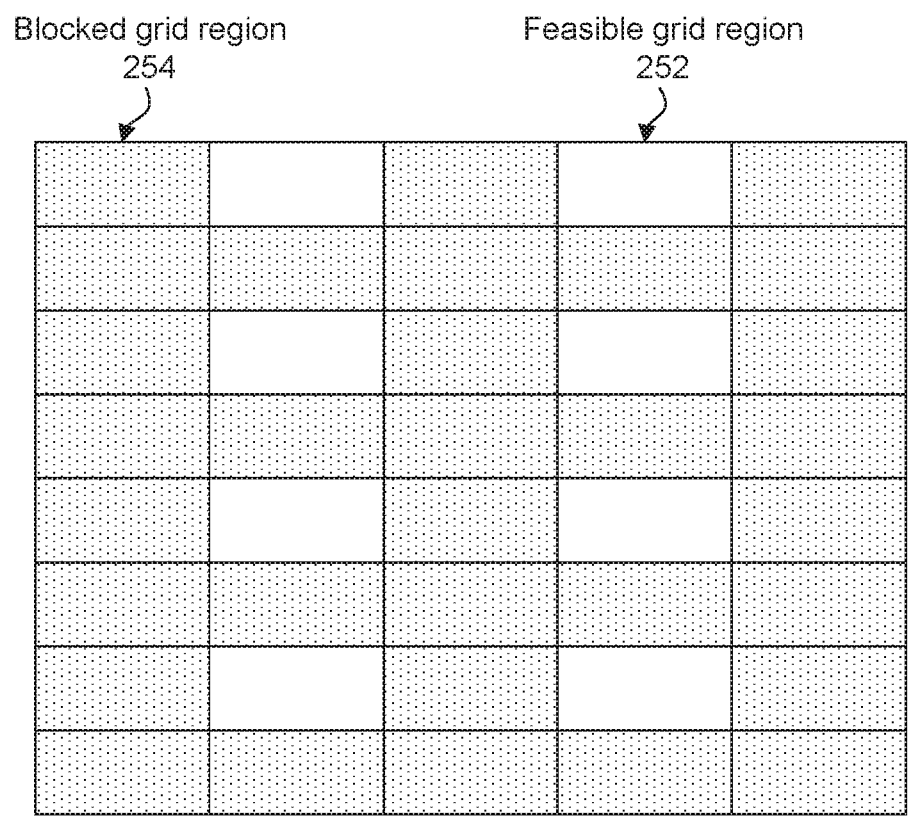

FIG. 2A and FIG. 2B illustrate snapping patterns in accordance with some embodiments described herein. A snapping pattern can be created based on a predefined pattern and user-specified repeater library cells. FIG. 2A illustrates a checkerboard snapping pattern, and FIG. 2B illustrates an array snapping pattern. As shown in FIG. 2A, the checkerboard snapping pattern arranges the repeaters like a checkerboard. Specifically, the checkerboard snapping pattern includes blocked grid regions (e.g., blocked grid region 204) and feasible gird regions (e.g., feasible grid region 202) that are arranged in a checkerboard pattern. During repeater insertion, the repeaters are allowed to be placed in any of the feasible grid regions, but are not allowed to be placed in any of the blocked grid regions.

FIG. 2B illustrates an array snapping pattern in which feasible grid regions (e.g., feasible grid region 252) are arranged in an array pattern. As shown in FIG. 2B, feasible grid regions are separated by blocked grid regions (e.g., blocked grid region 254). The blocked grid regions can be used by the router to create violation-free routes. The horizontal and vertical spacing between the feasible grid regions can be determined by using one or more of: (1) the repeater cell size, (2) desired spacing between adjacent repeaters, and (3) any additional adjustments desired by a user.

Figure 3:
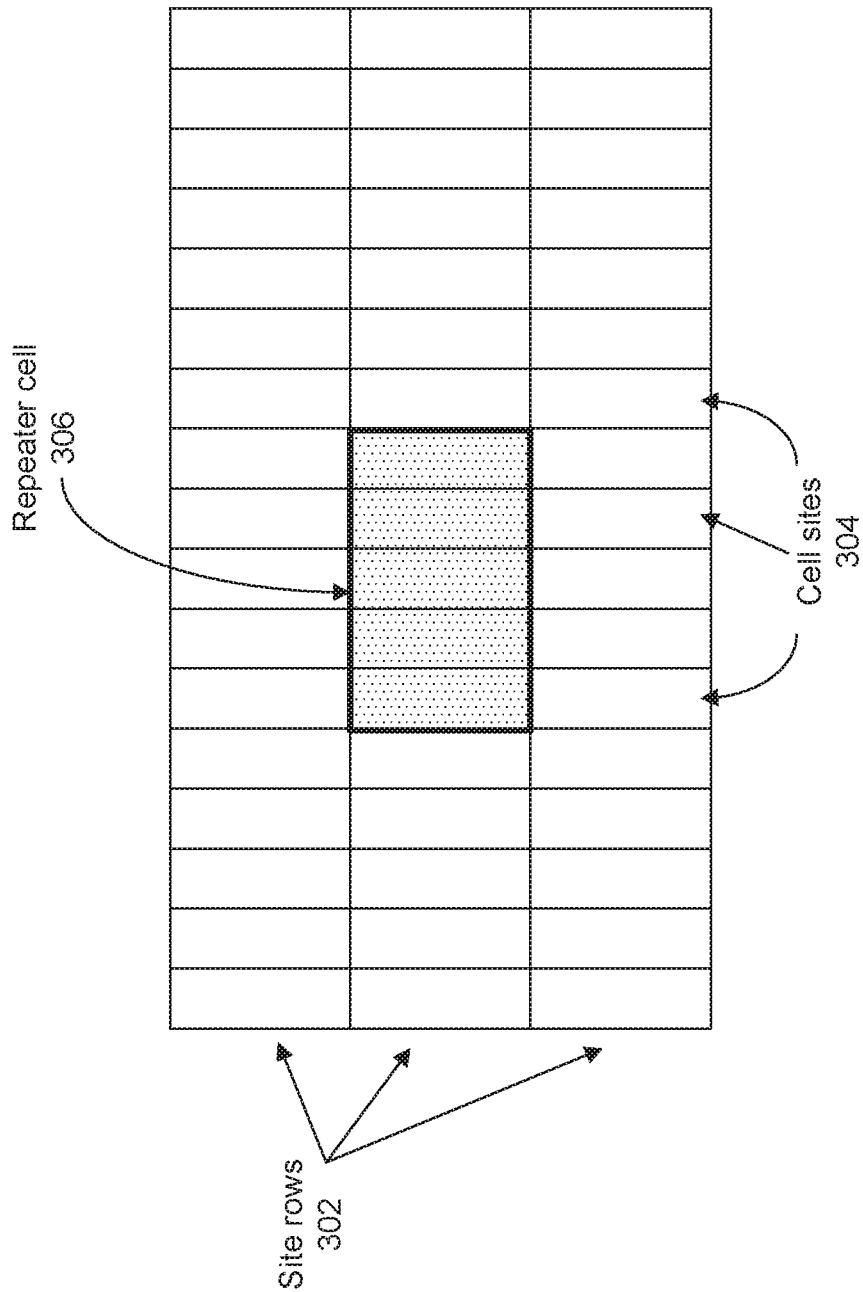
FIG. 3 illustrates snapping regions, according to an exemplary embodiment of the present disclosure.

FIG. 3 illustrates snapping regions in accordance with some embodiments described herein. In an IC design, a cell site (e.g., cell sites 304) is the smallest placement area for placing a cell. Cell sites can be arranged in rows, e.g., site rows 302, and each cell site can have a predefined width. In some embodiments, the height of a repeater cell (e.g., repeater cell 306) can be equal to the height of a cell site, and the width of the repeater cell can be an integral multiple of the width of a cell site. In other embodiments, the height of a repeater cell can be an integral multiple of the height of a cell site. For legal repeater placement, boundaries of a repeater cell must be aligned to the boundaries of cell sites, and the repeater cell must be placed in an allowable orientation.

A snapping region can be an area where one or more snapping patterns are used to place repeaters. The snapping grid in a snapping region is derived based on the snapping pattern. The size of a snapping grid is at least the size of a repeater cell, which ensures that adjacent repeaters do not overlap. Each snapping grid is marked as either a feasible grid region or blocked grid region. A repeater is placed only on feasible grid regions. The term "snapping" refers to the operation of placing a repeater only on the feasible grid regions.

A snapping grid can be used to place different repeaters having the same width by using the same snapping pattern. If repeaters with different widths are needed in the IC design, then multiple snapping grids can be created for the same placement area using the same or different patterns. In such scenarios, a repeater placed in one snapping grid can cause one or more feasible grid regions in the other snapping grids to become blocked.

As shown in FIGS. 2A, 2B, and 3, repeaters are placed and inserted in feasible grid regions in checkerboard or array pattern. The routing length for nets in the bus between repeaters is same. Moreover, the repeaters in checkerboard or array pattern with reserved space between neighboring repeaters allow DRC violation free routing. Accordingly, repeaters can solve the problem of interconnect delay.

However, in advanced node, high-speed routes are pushed higher into the metal stack layer, for example, M13 layer, to take advantage of their lower resistance. Pins in the repeaters are usually on the lower layer like M1 layer. In general, a detail router can be used to connect higher metal layer routes to pins of the repeaters on the lower layer. However, routing detour from higher metal layer to lower metal layer may cause routing DRC violations and long routing run time. The long routing run time may in turn cause the timing for each net of the bus vary. Further, it may be very difficult to fix the routing DRC violations.

DETAILED DESCRIPTION—EXEMPLARY PRE-ROUTED VARIANT LIBRARY CELLS

To solve routing DRC violations and meet timing requirements in advanced node, direction-specific pre-routed variant repeater library (lib) cells and Pseudo Master Repeater (PMR) lib cell are created. The PMR lib cell has pin regions derived from pins of the variant repeater lib cells.

In some embodiments, pre-routed variant library cell is a library cell with pins at higher level and pre-defined routes inside. Inside the cell, the routes are routing DRC free. Because the pins are also in the higher metal layer instead of lower metal layer, routes on higher metal layer can be easily tapped to these higher metal layer pins without going down through many metal layers. With pre-defined routes inside in the pre-routed variant lib cells, router will only need to route from higher layer routes to higher layer pins. Accordingly, routing can be faster and probabilities of routing DRC violation inside cells are greatly reduced.

Figure 4:
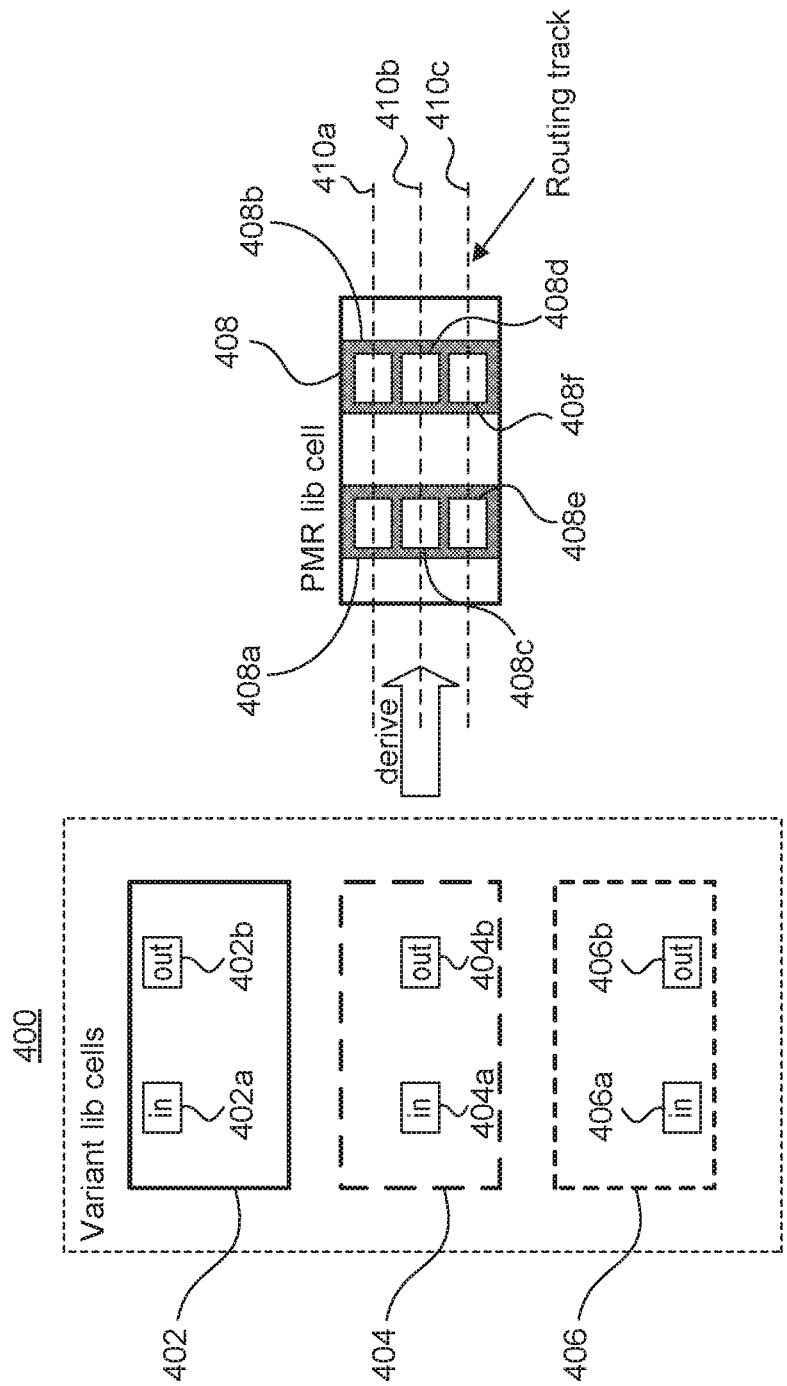
FIG. 4 illustrates library cells for horizontal routing scenario, according to an exemplary embodiment of the present disclosure.
Figure 5:
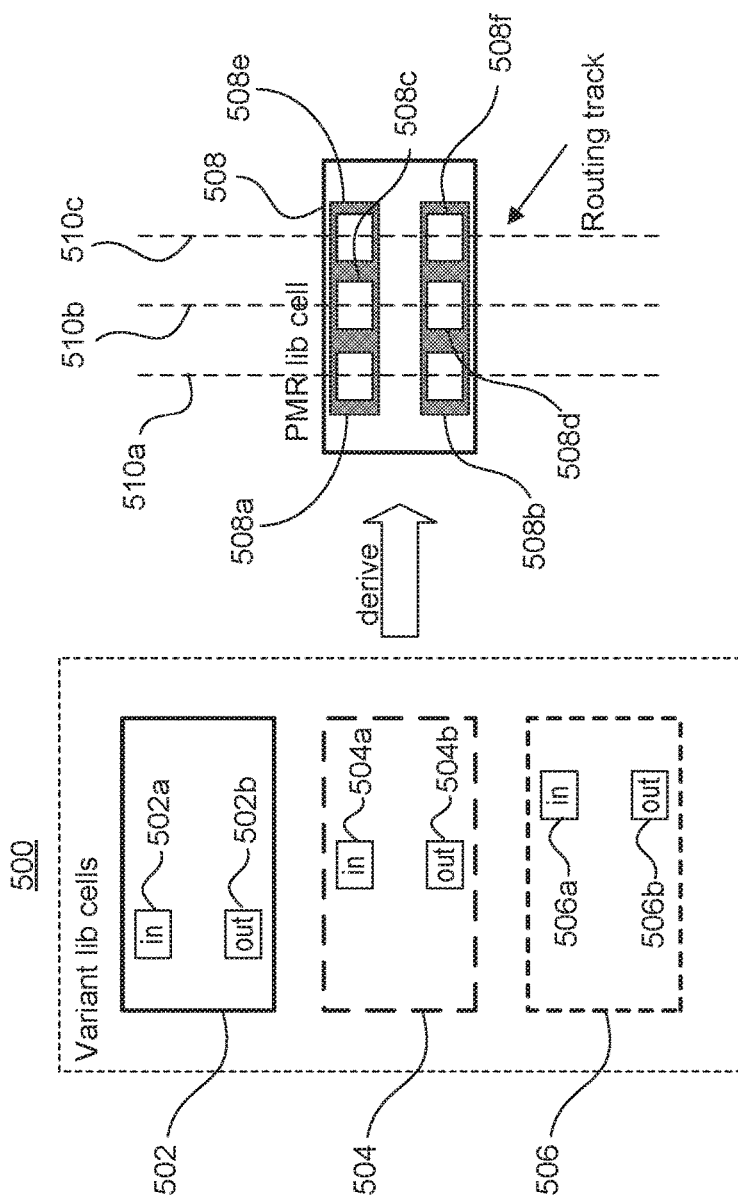
FIG. 5 illustrates library cells for vertical routing scenario, according to an exemplary embodiment of the present disclosure.

The routing layers may be directional. By way of non-limiting examples, routing layers may be horizontal and/or vertical. For directional routing layers, direction specific pre-routed variant lib cells are needed. For example, a routing layer 400 in horizontal direction is shown in FIG. 4 and a routing layer 500 in vertical direction is shown in FIG. 5.

The routing layer 400 includes variant lib cells 402, 404, and 406. The routing layer 400 may include more than three variant lib cells, but only three variant lib cells 402, 404 and 406 are shown. The variant lib cells 402, 404, and 406 are of the same size. Inside the variant lib cells 402, 404, and 406 repeaters may be placed. The repeaters placed in the variant lib cells may have input pins and output pins. The repeaters in the variant lib cells 402, 404, and 406 may have input pins at area 402a, 404a, and 406a. Similarly, the output pins of the repeaters in the variant lib cells 402, 404, and 406 may be at area 402b, 404b, and 406b. The input and output pins of the repeaters in the variant lib cells 402, 404, and 406 are arranged horizontally. The input and output pins of the repeaters in the variant lib cells may be placed on horizontal routing tracks that intersect with the variant lib cells.

The routing layer 500 includes variant lib cells 502, 504, and 506. The routing layer 500 may include more than three variant lib cells, but only three variant lib cells 502, 504 and 506 are shown. The variant lib cells 502, 504, and 506 are of the same size. Inside the variant lib cells 502, 504, and 506 repeaters may be placed. The repeaters placed in the variant lib cells may have input pins and output pins. The repeaters in the variant lib cells 502, 504, and 506 may have input pins at area 502a, 504a, and 506a. Similarly, the output pins of the repeaters in the variant lib cells 502, 504, and 506 may be at area 502b, 504b, and 506b. The input and output pins of the repeaters in the variant lib cells are arranged horizontally. The input and output pins of the repeaters in the variant lib cells 502, 504, and 506 may be placed on vertical routing tracks that intersect with the variant lib cells.

DETAILED DESCRIPTION—EXEMPLARY
PSEUDO MASTER REPEATER LIBRARY CELL

In some embodiments, a pseudo master repeater (PMR) lib cell is derived from all variant repeater lib cells in the same direction. The PMR lib cell may have the same size as other variant repeater lib cells in the same direction. However, the pin region of the PMR lib cell may be derived based on the input and output pin regions of the associated variant repeater lib cells. Accordingly, the pin region of the PMR lib cell may be large enough to cover all input and output pin regions of the associated variant repeater lib cells. The input and output pin regions of the PMR lib cell may be used to determine how the routes of the nets or the bus are connected with the repeaters.

FIG. 4 shows a PMR lib cell 408 in the horizontal direction. Since the PMR lib cell 408 is of the same size as the other variant repeater lib cells 402, 404, and 406, and the PMR lib cell 408 is associated with the variant lib cells 402, 404, and 406, input pin regions 408a, 408c, and 408e of the PMR lib cell 408 corresponds with the input pin region of the variant lib cells 402, 404, and 406 respectively. Similarly, output pin regions 408b, 408d, and 408f of the PMR lib cell 408 corresponds with the output pin region of the variant lib cells 402, 404, and 406 respectively. As described above, the input and output pin regions of the PMR lib cell 408 are on the horizontal routing tracks 410a, 410b, and 410c intersecting the PMR lib cell 408.

FIG. 5 shows a PMR lib cell 508 in the vertical direction. Since the PMR lib cell 508 is of the same size as the other variant repeater lib cells 502, 504, and 506, and the PMR lib cell 508 is associated with the variant lib cells 502, 504, and 506, input pin regions 508a, 508c, and 508e of the PMR lib cell 508 corresponds with the input pin region of the variant lib cells 502, 504, and 506 respectively. Similarly, output pin regions 508b, 508d, and 508f of the PMR lib cell 508 corresponds with the output pin region of the variant lib cells 502, 504, and 506 respectively. As described above, the input and output pin regions of the PMR lib cell 508 are on the vertical routing tracks 510a, 510b, and 510c intersecting the PMR lib cell 508.

Figure 6:
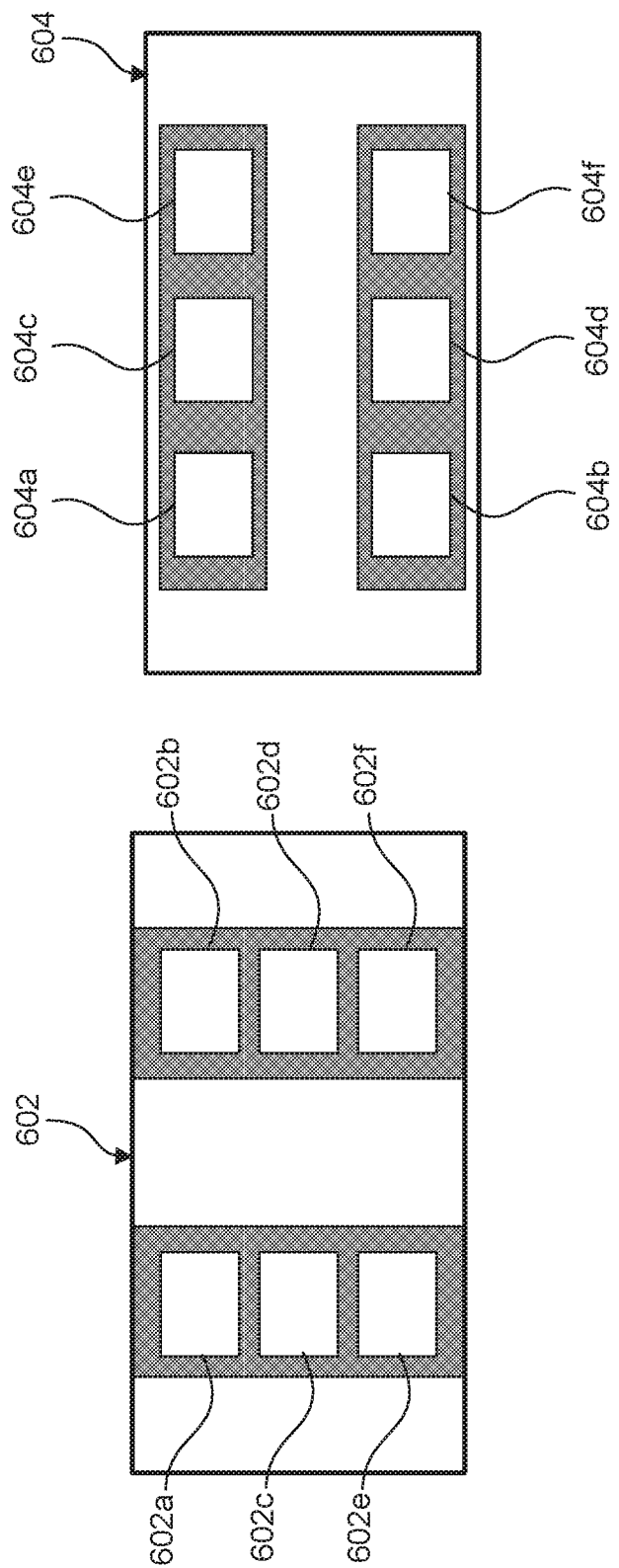
FIG. 6 illustrates pin region, according to an exemplary embodiment of the present disclosure.

FIG. 6 illustrates pin regions of the horizontal PMR lib cell 602 and the vertical PMR lib cell 604. As described above, the pin regions 602a, 602c, and 602e of the horizontal PMR lib cell 602 corresponds with the input pin region of the variant lib cells 402, 404, and 406 respectively. Further, the pin regions 602a, 602c, and 602e are large enough to cover all input pins of the variant lib cells 402, 404, and 406 respectively. Similarly, the pin regions 602b, 602d, and 602f of the horizontal PMR lib cell 602 correspond with the output pin region of the variant lib cells 402, 404, and 406 respectively. Further, the pin regions 602b, 602d, and 602f are large enough to cover all output pins of the variant lib cells 402, 404, and 406 respectively. Even though, 602a, 602c, and 602e are disclosed here as input pin regions and 602b, 602d, and 602f are disclosed here as output pin regions, a person skilled in the art may recognize that these are pin regions and whether they are input pin regions or output pin regions are not of any significance.

Similarly, the pin regions 604a, 604c, and 604e of the vertical PMR lib cell 604 corresponds with the input pin region of the variant lib cells 502, 504, and 506 respectively. Further, the pin regions 604a, 604c, and 604e are large enough to cover all input pins of the variant lib cells 502, 504, and 506 respectively. Similarly, the pin regions 604b, 604d, and 604f of the vertical PMR lib cell 604 correspond with the output pin region of the variant lib cells 502, 504, and 506 respectively. Further, the pin regions 604b, 604d, and 604f are large enough to cover all output pins of the variant lib cells 502, 504, and 506 respectively. Even though, 604a, 604c, and 604e are disclosed here as input pin regions and 604b, 604d, and 604f are disclosed here as output pin regions, a person skilled in the art may recognize that these are pin regions and whether they are input pin regions or output pin regions are not of any significance.

Figure 7:
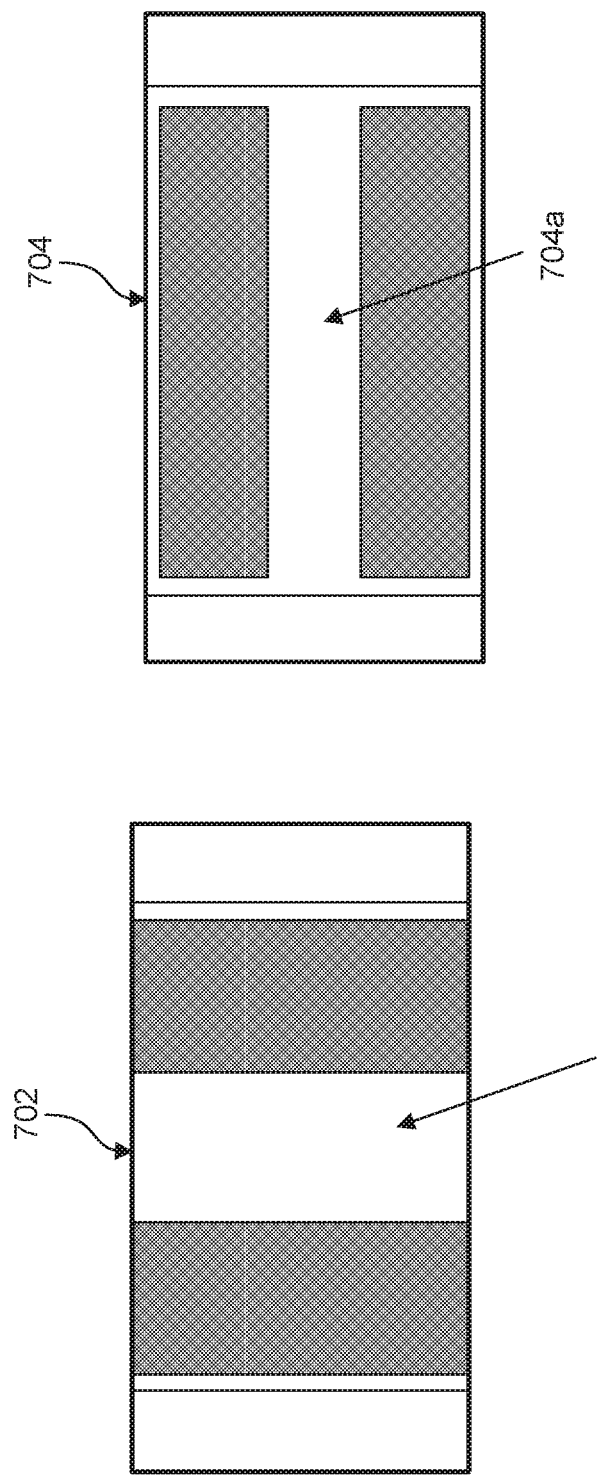
FIG. 7 illustrates route touch region, according to an exemplary embodiments of the present disclosure.

FIG. 7 illustrates route touch regions for the horizontal PMR lib cell 702 and the vertical PMR lib cell 704. The horizontal PMR lib cell 702 may be similar to the horizontal PMR lib cell 602 shown in FIG. 6. The vertical PMR lib cell 704 may be similar to the vertical PMR lib cell 604 shown in FIG. 6. A Route touch region 702a of the horizontal PMR lib cell 702 is derived based on the pin regions of the PMR lib cell 702. A Route touch region 704a of the vertical PMR lib cell 704 is derived based on the pin regions of the PMR lib cell 704. The route touch region 702a is derived from the pin regions of the PMR lib cell 702. Similarly, the route touch region 704a is derived from the pin regions of the PMR lib cell 704. Accordingly, the route touch regions 702a and 704a are the regions that cover the corresponding pin regions fully with a pre-defined padding. The route touch region is used as the basic grid size of the placement grid size of the placement grid in a snapping pattern. The snapping pattern as described above may be a checkerboard pattern or an array pattern. Therefore, if a route is passing through a set row or a set column of the route touch regions, the repeater may be inserted along the row or column of the snapping grid. By way of non-limiting example, a height of the route touch region is same as a height of the lib cell.

DETAILED DESCRIPTION—EXEMPLARY
REPEATER INSERTING USING PMR LIB CELL

In some embodiments, the PMR lib cell as derived above may be used as reference while inserting repeaters on the nets or the bus in the route touch region instead of the user provided variant lib cells for inserting the repeaters. After the repeaters are inserted with reference to the PMR lib cell, the repeaters are arranged into predefined pattern as described in the U.S. patent application Ser. No. 16/594,914 titled "Self-Organized Snapping for Repeater Planning" and filed on Oct. 7, 2019, which is hereby incorporated by reference in its entirety for all purposes. Thus, the PMR lib cell may act as a variant lib cell for initial placement of the repeaters instead of the user provided variant lib cells.

Figure 8:
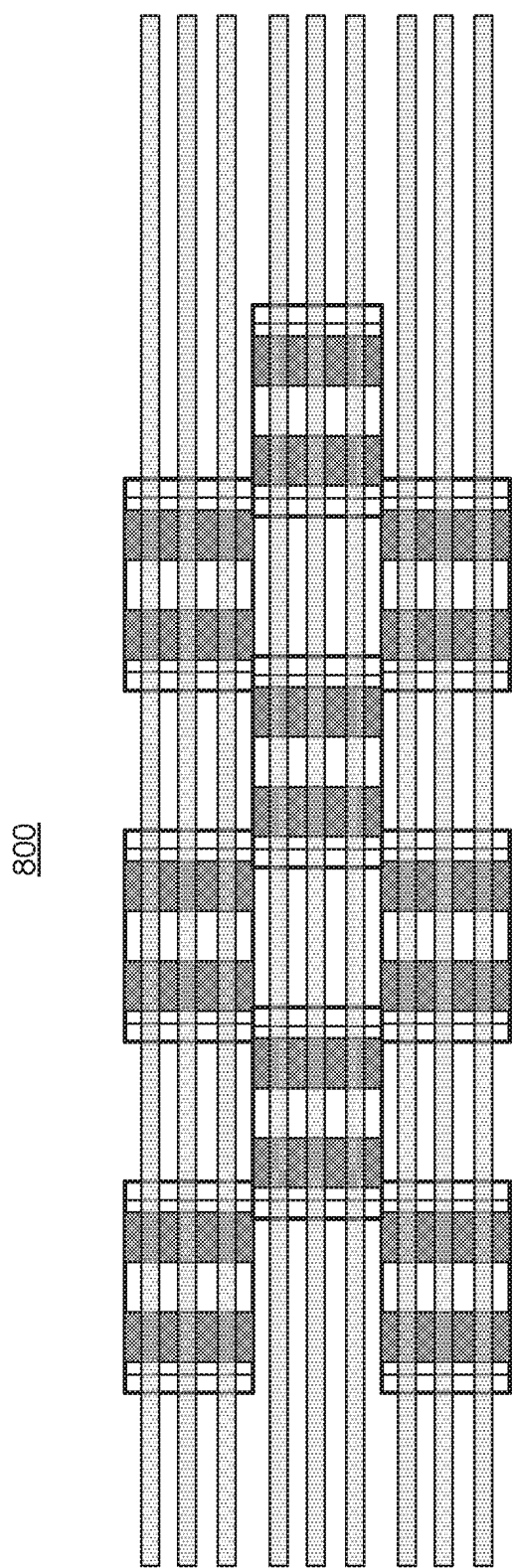
FIG. 8 illustrates bus buffering for horizontal routes, according to an exemplary embodiments of the present disclosure.
Figure 9:
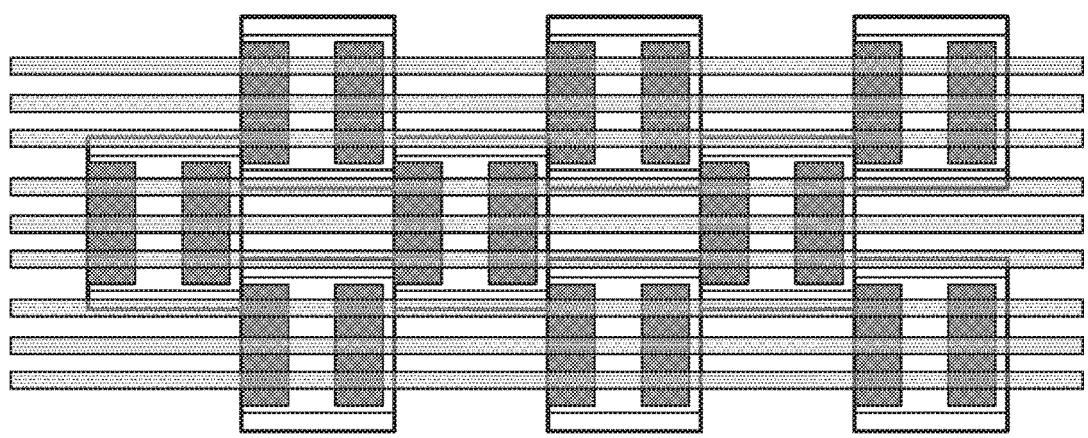
FIG. 9 illustrates bus buffering for vertical routes, according to an exemplary embodiments of the present disclosure.

FIG. 8 and FIG. 9 illustrate repeaters 800 and 900 inserted on the nets or the bus in the checkerboard pattern for the horizontal and the vertical routing layers respectively. After initial placement of the repeaters in 800 and 900 with reference to the PMR lib cell, the repeaters are moved or swapped to their target variant lib cells as described in the U.S. patent application Ser. No. 16/594,914. As described above, the routes go through the route touch region. Accordingly, the target variant lib cell is selected based on the intersection area of the routes and the pin regions of the repeater.

After the repeaters are moved or swapped to their target lib cells from the PMR lib cell, the route may be cut at the locations of the pins and assigned to the nets of the repeaters. The nets may be input nets or output nets.

Figure 10:
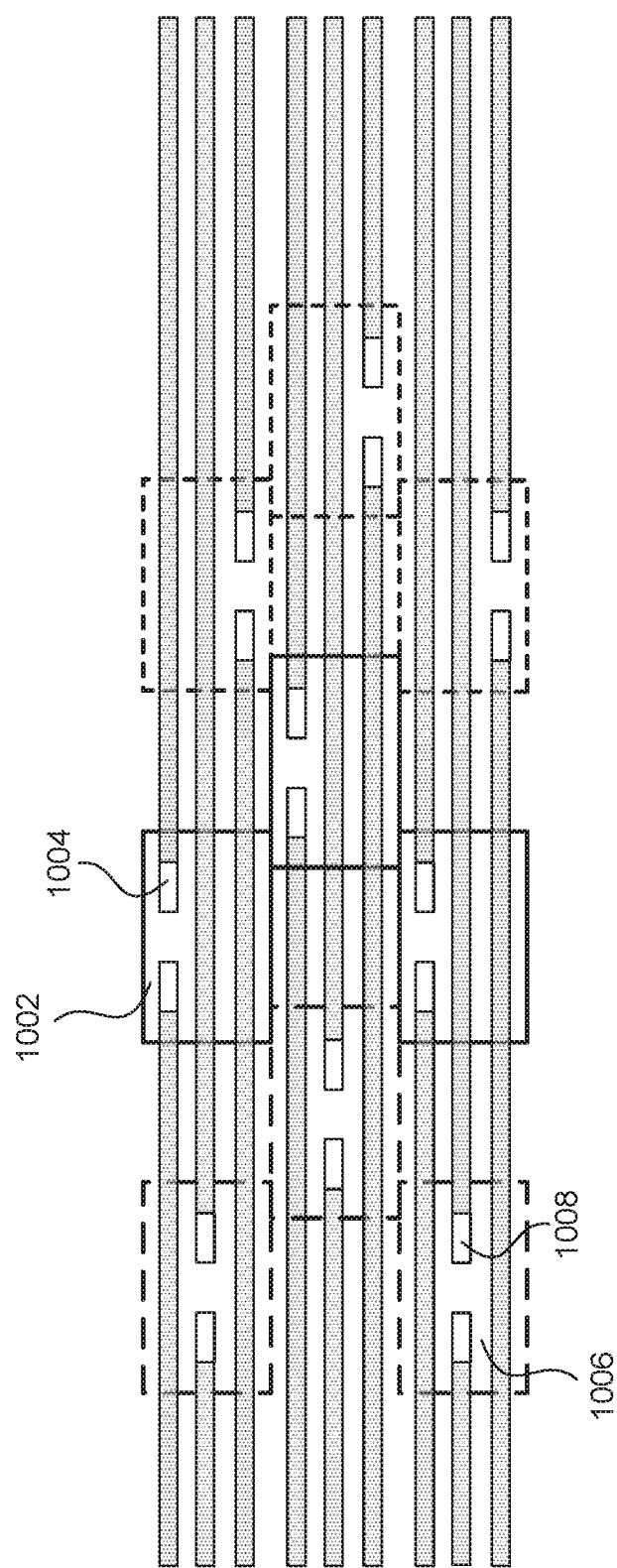
FIG. 10 illustrates bus buffering with pre-routed library cells on horizontal routes, according to an exemplary embodiments of the present disclosure.

As shown in FIG. 10 routes are cut at the locations 1002 and 1004 for a repeater swapped from the PMR lib cell to a target lib cell based on the pin locations of the repeater. Similarly, routes are cut at the locations 1006 and 1008 for another repeater swapped from the PMR lib cell to another target lib cell based on the pin locations of the other repeater. Routes shown in FIG. 10 are for routing in the horizontal direction.

Figure 11:
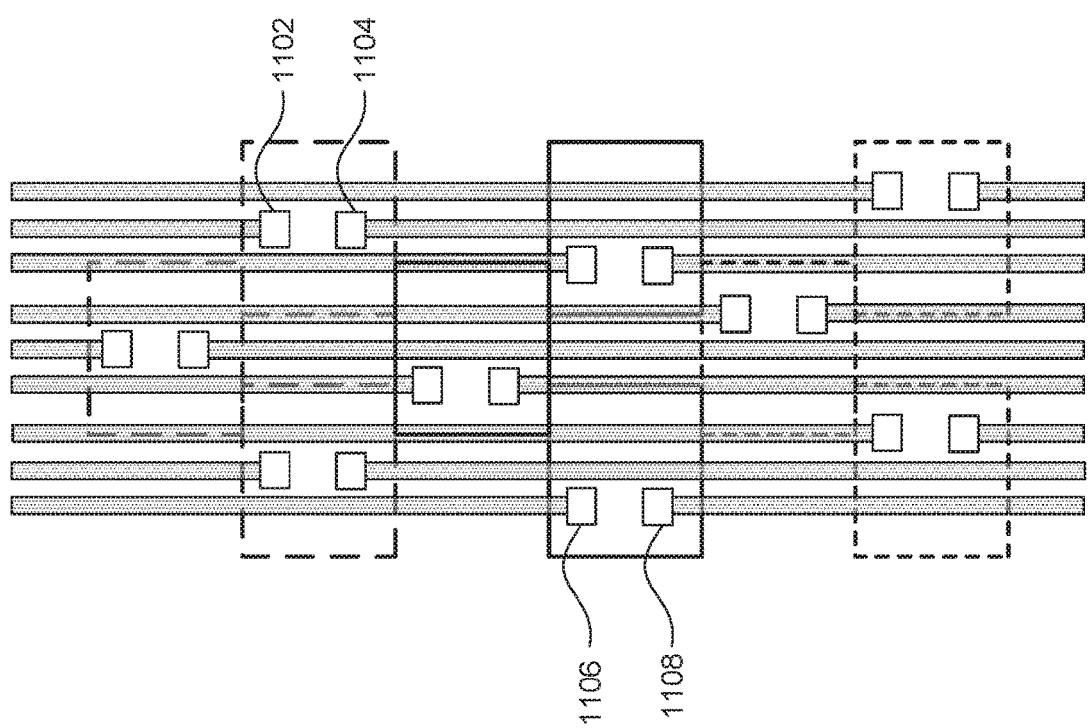
FIG. 11 illustrates bus buffering with pre-routed library cells on vertical routes, according to an exemplary embodiments of the present disclosure.

As shown in FIG. 11 routes are cut at the locations 1102 and 1104 for a repeater swapped from the PMR lib cell to a target lib cell based on the pin locations of the repeater. Similarly, routes are cut at the locations 1106 and 1108 for another repeater swapped from the PMR lib cell to another target lib cell based on the pin locations of the other repeater. Routes shown in FIG. 11 are for routing in the horizontal direction.

Further, after route cutting, pins of the repeaters are almost aligned with the routes. Further, because the pins and the routes are on the same metal layer, problems of long routing and DRC violations do not occur. However, if the pins and the routes are not on the same metal layers, vias may be added to connect the routes and pins. Further, the repeaters at the target lib cells may also provide bus buffering.

DETAILED DESCRIPTION—EXEMPLARY METHOD FOR ON-ROUTE REPEATER PLANNING FOR A BUS

Figure 12:
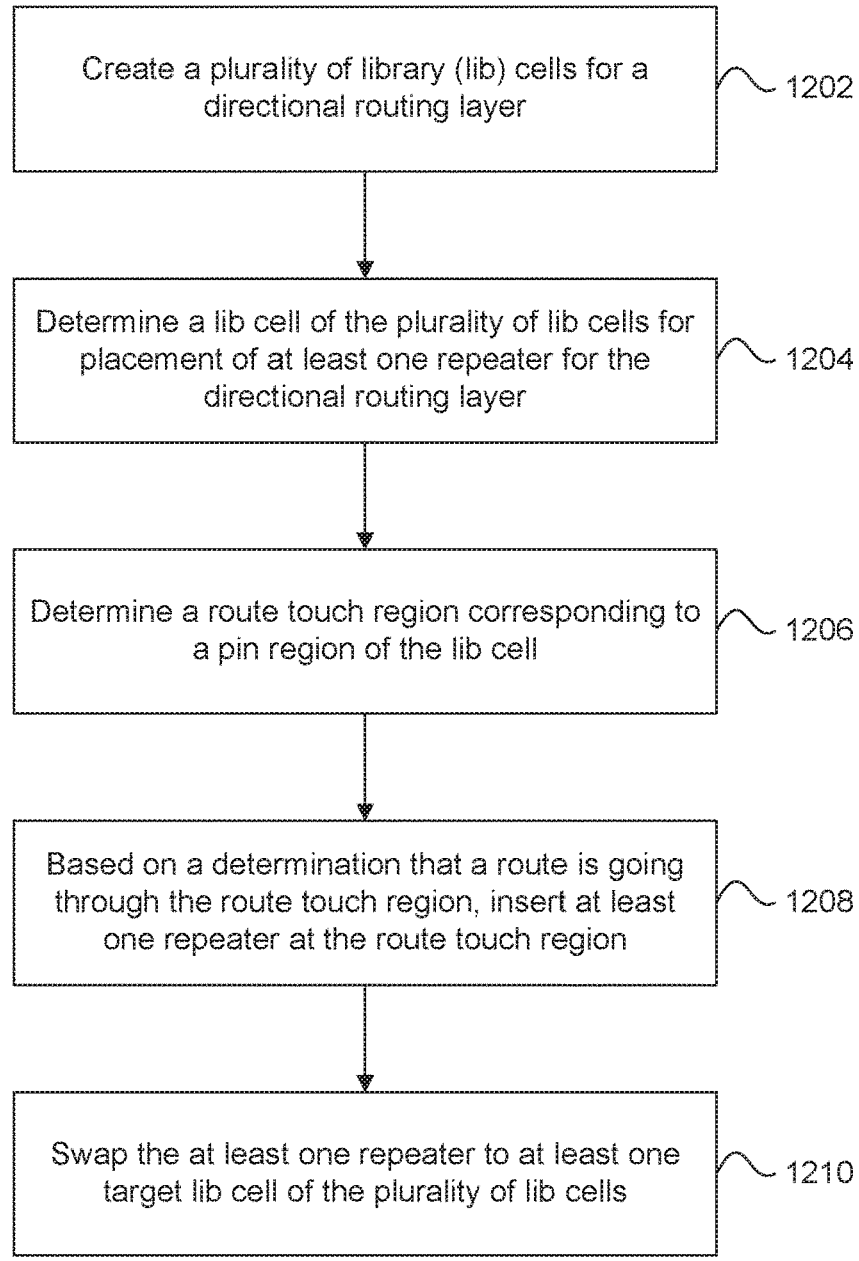
FIG. 12 illustrates a flow-chart of method steps for on-route repeater planning for a bus, according to an exemplary embodiments of the present disclosure.

FIG. 12 illustrates a flow-chart 1200 of method steps for on-route repeater planning for a bus, according to an exemplary embodiments of the present disclosure. At step 1202, a plurality of library (lib) cells for a directional routing layer are created. The direction routing layer may be a routing layer in a horizontal or a vertical direction. The plurality of library cells are special cells and may be pre-routed variant library cells. The pre-routed variant library cells may include pre-defined routes inside the lib cell and pins in the higher metal layer, which generally has low resistance compared to the lower metal layer. The pre-defined routes are free from a DRC violation. The pins in the higher metal layer may be the input pins or the output pins of the repeater. The input pins and the output pins may be arranged in a direction of the routing layer. Accordingly, if the direction of the routing layer is horizontal then the input and the output pins are also arranged in the horizontal direction. And, if the direction of the routing layer is vertical then the input and the output pins are also arranged in the vertical direction. By way of non-limiting example, the input pins, the output pins, and pre-defined routes or routing tracks are placed on the same metal track layer such as a top metal layer. In some cases, the input pins and the output pins may be placed on a different layer than the pre-defined routes or routing tracks. The repeater described in this disclosure may be a buffer and/or an inverted buffer.

At step 1204, a lib cell of the plurality of lib cells is determined or derived as a pseudo master repeater (PMR) lib cell. The plurality of lib cells are pre-routed variant lib cells created at step 1202 above for at least one repeater to be inserted at the pre-routed variant lib cell. The derived PMR lib cell has characteristics as described above. Accordingly, the PMR lib cell has pin regions large enough to cover for all pins of the associated pre-routed variant lib cells with repeaters. The PMR lib cell is in the same direction as the routing layer and the plurality of pre-routed variant lib cells.

At step 1206, a route touch region corresponding to the pin region of the PMR lib cell as determined at step 1204 is determined. As described above, the route touch region is the region that covers full pin regions with a pre-defined padding. The route touch region is used as the basic grid size of the placement grid and arranged in a snapping pattern. The snapping pattern may be checkerboard and/or array pattern as described above. The height of the route touch region may be same as the height of the PMR lib cell.

At step 1208, based on the determination that a route is going through the route touch region, at least one repeater may be inserted at the route touch region. As described above, after the at least one repeater is inserted at step 1208, the repeater may be swapped to at least one target lib cell at step 1210. The at least one target lib cell may be the pre-routed variant lib cell. After the at least one repeater is swapped to the at least one target lib cell from the PMR lib cell, the pre-defined routes may be cut at the locations of the input pins and the output pins inside the at least target lib cell. In case the input pins and the output pins are on a different routing layer from the pre-defined routes, vias may be added to connect the pre-defined routes with the input and/or the output pins.

DETAILED DESCRIPTION—TECHNOLOGY SUPPORT FROM DATA/INSTRUCTIONS TO PROCESSORS/PROGRAMS

Data and Information. While 'data' and 'information' often are used interchangeably (e.g., 'data processing' and 'information processing'), the term 'datum' (plural 'data') typically signifies a representation of the value of a measurement of a physical quantity (e.g., the current in a wire), or the answer to a question (e.g., "yes" or "no"), while the term 'information' typically signifies a structured set of data (often times signified by 'data structure'). A specified data structure is used to structure an electronic device to be used as a specific machine as an article of manufacture (see In re Lowry, 32 F.3d 1579 [CAFC, 1994]). Data and information are physical, for example binary data (a 'bit', usually signified with '0' and '1') enabled with two different levels of voltage in a circuit. For example, data can be enabled as an electrical, magnetic, optical or acoustical signal; a quantum state such as spin that enables a 'qubit'; or a physical state of an atom or molecule. All such data and information, when enabled, are stored, accessed, transferred, combined, compared, or otherwise acted upon, actions that require energy.

As used herein, the term 'process' signifies an unnatural sequence of physical actions and/or transformations (both also referred to as 'operations' or 'steps') to produce at least one result. The actions and transformations are technical applications of one or more natural laws of science or unnatural laws of technology. The actions and transformations often change the physical state of a machine, of structures of data and information, or of a composition of matter. Two or more actions can occur at about the same time, or one action can occur before or after another action, if they produce the same result. A description of the physical actions and/or transformations that comprise a process are often signified with a set of gerund phrases (or their semantic equivalents) that are typically preceded with the signifier 'the steps of' (e.g., "a process comprising the steps of measuring, transforming, partitioning and then distributing . . . "). The signifiers 'algorithm', 'method', 'procedure', '(sub)routine', 'protocol', 'recipe', and 'technique' often are used interchangeably with 'process', and 35 U.S.C. 100 defines a "method" as one type of process that is, by statutory law, always patentable under 35 U.S.C. 101. Many forms of knowledge, learning, skills and styles are authored, structured, and enabled—objectively—as processes—e.g., knowledge and learning as functions in knowledge programming languages. As used herein, the term 'rule' signifies a process with at least one conditional test (signified, e.g., by 'IF test THEN process'). As used herein, the term 'thread' signifies a sequence of operations or instructions that comprise a subset of an entire process. A process can be partitioned into multiple threads that can be used at or about at the same time.

As used herein, the term 'component' (also signified by 'part', and typically signified by 'element' when described in a patent text or diagram) signifies a physical object that is used to enable a process in combination with other components. For example, electronic components are used in processes that affect the physical state of one or more electromagnetic or quantum particles/waves (e.g., electrons, photons) or quasiparticles (e.g., electron holes, phonons, magnetic domains) and their associated fields or signals. Electronic components have at least two connection points to which are attached 'leads', typically a conductive wire or an optical fiber, with one end attached to the component and the other end attached to another component, typically as part of a circuit with current flows. There are at least three types of electrical components: passive, active and electromechanical. Passive electronic components typically do not introduce energy into a circuit—such components include resistors, memristors, capacitors, magnetic inductors, crystals, Josephson junctions, transducers, sensors, antennas, waveguides, etc. Active electronic components require a source of energy and can inject energy into a circuit—such components include semiconductors (e.g., diodes, transistors, optoelectronic devices), vacuum tubes, batteries, power supplies, displays (e.g., LEDs, LCDs, lamps, CRTs, plasma displays). Electromechanical components affect current flow using mechanical forces and structures—such components include switches, relays, protection devices (e.g., fuses, circuit breakers), heat sinks, fans, cables, wires, terminals, connectors and printed circuit boards. As used herein, the term 'netlist' is a specification of the components comprising an electric circuit, and electrical connections between the components. The programming language for the SPICE circuit simulation program is often used to specify a netlist. In the context of circuit design, the term 'instance' signifies each time a component is specified in a netlist.

One of the most important components as goods in commerce is the integrated circuit, and its res of abstractions. As used herein, the term 'integrated circuit' signifies a set of connected electronic components on a small substrate (thus the use of the signifier 'chip') of semiconductor material, such as silicon or gallium arsenide, with components fabricated on one or more layers. Other signifiers for 'integrated circuit' include 'monolithic integrated circuit', 'IC', 'chip', 'microchip' and 'System on Chip' ('SoC'). Examples of types of integrated circuits include gate/logic arrays, processors, memories, interface chips, power controllers, and operational amplifiers. The term 'cell' as used in electronic circuit design signifies a specification of one or more components, for example, a set of transistors that are connected to function as a logic gate. Cells are usually stored in a database, to be accessed by circuit designers and design processes.

As used herein, the term 'module' signifies a tangible structure for acting on data and information. For example, the term 'module' can signify a process that transforms data and information, for example, a process comprising a computer program. The term 'module' also can signify one or more interconnected electronic components, such as digital logic devices. A process comprising a module, if specified in a programming language, such as System C or Verilog, also can be transformed into a specification for a structure of electronic components that transform data and information that produce the same result as the process. This last sentence follows from a modified Church-Turing thesis, which is simply expressed as "Whatever can be transformed by a (patentable) process and a processor, can be transformed by a (patentable) equivalent set of modules," as opposed to the doublethink of deleting only one of the "(patentable)".

A module is permanently structured (e.g., circuits with unalterable connections), temporarily structured (e.g., circuits or processes that are alterable with sets of data), or a combination of the two forms of structuring. Permanently structured modules can be manufactured, for example, using Application Specific Integrated Circuits ('ASICs') such as Arithmetic Logic Units ('ALUs'), Programmable Logic Arrays ('PLAs'), or Read Only Memories ('ROMs'), all of which are typically structured during manufacturing. For example, a permanently structured module can comprise an integrated circuit. Temporarily structured modules can be manufactured, for example, using Field Programmable Gate Arrays (FPGAs—for example, sold by Xilink or Intel's Altera), Random Access Memories (RAMs) or microprocessors. For example, data and information is transformed using data as an address in RAM or ROM memory that stores output data and information. One can embed temporarily structured modules in permanently structured modules (for example, a FPGA embedded into an ASIC).

Modules that are temporarily structured can be structured during multiple time periods. For example, a processor comprising one or more modules has its modules first structured by a manufacturer at a factory and then further structured by a user when used in commerce. The processor can comprise a set of one or more modules during a first time period, and then be restructured to comprise a different set of one or modules during a second time period. The decision to manufacture or implement a module in a permanently structured form, in a temporarily structured form, or in a combination of the two forms, depends on issues of commerce such as cost, time considerations, resource constraints, tariffs, maintenance needs, national intellectual property laws, and/or specific design goals. How a module is used is mostly independent of the physical form in which it is manufactured or enabled. This last sentence also follows from the modified Church-Turing thesis.

As used herein, the term 'processor' signifies a tangible data and information processing machine for use in commerce that physically transforms, transfers, and/or transmits data and information, using at least one process. A processor consists of one or more modules (e.g., a central processing unit, 'CPU', an input/output ('I/O') controller, a memory controller, a network controller, and other modules). The term 'processor' can signify one or more processors, or one or more processors with multiple computational cores/CPUs, specialized processors (for example, graphics processors or signal processors), and their combinations. Where two or more processors interact, one or more of the processors can be remotely located. Where the term 'processor' is used in another context, such as a 'chemical processor', it will be signified and defined in that context.

The processor can comprise, for example, digital logic circuitry (for example, a binary logic gate), and/or analog circuitry (for example, an operational amplifier). The processor also can use optical signal processing, DNA transformations or quantum operations, microfluidic logic processing, or a combination of technologies, such as an optoelectronic processor. For data and information structured with binary data, any processor that can transform data and information using the AND, OR and NOT logical operations (and their derivatives, such as the NAND, NOR, and XOR operations) also can transform data and information using any function of Boolean logic. A processor such as an analog processor, such as an artificial neural network, also can transform data and information. No scientific evidence exists that any of these technological processors are processing, storing and retrieving data and information, using any process or structure equivalent to the bioelectric structures and processes of the human brain.

The one or more processors also can use a process in a 'cloud computing' environment, where time and resources of multiple remote computers are shared by multiple users or processors communicating with the computers. For example, a group of processors can use at least one process available at a distributed or remote system, these processors using a communications network (e.g., the Internet, or an Ethernet) and using one or more specified interfaces (e.g., an application program interface ('API') that signifies functions and data structures to communicate with the remote process).

As used herein, the term 'computer' and 'computer system' (further defined below) includes at least one processor that, for example, performs operations on data and information such as (but not limited to) the AND, OR and NOT logical operations using electronic gates that can comprise transistors, with the addition of memory (for example, memory structured with flip-flops using the NOT-AND or NOT-OR operation). Such a processor is Turing-complete and computationally universal. A computer can comprise a simple structure, for example, comprising an I/O module, a CPU, and a memory that performs, for example, the process of inputting a signal, transforming the signal, and outputting the signal with no human intervention.

As used herein, the term 'programming language' signifies a structured grammar for specifying sets of operations and data for use by modules, processors and computers. Programming languages include assembler instructions, instruction-set-architecture instructions, machine instructions, machine dependent instructions, microcode, firmware instructions, state-setting data, or either source code or object code written in any combination of one or more higher level languages, for example, the C programming language and similar general programming languages (such as Fortran, Basic, Javascript, PHP, Python, C++), knowledge programming languages (such as Lisp, Smalltalk, Prolog, or CycL), electronic structure programming languages (such as VHDL, Verilog, SPICE or SystemC), text programming languages (such as SGML, HTML, or XML), or audiovisual programming languages (such as SVG, MathML, X3D/VRML, or MIDI), and any future equivalent programming languages. As used herein, the term 'source code' signifies a set of instructions and data specified in text form using a programming language. A large amount of source code for use in enabling any of the claimed inventions is available on the Internet, such as from a source code library such as Github.

As used herein, the term 'program' (also referred to as an 'application program') signifies one or more processes and data structures that structure a module, processor or computer to be used as a "specific machine" (see In re Alappat, 33 F3d 1526 [CAFC, 1991]). One use of a program is to structure one or more computers, for example, standalone, client or server computers, or one or more modules, or systems of one or more such computers or modules. As used herein, the term 'computer application' signifies a program that enables a specific use, for example, to enable text processing operations, or to encrypt a set of data. As used herein, the term 'firmware' signifies a type of program that typically structures a processor or a computer, where the firmware is smaller in size than a typical application program, and is typically not very accessible to or modifiable by the user of a computer. Computer programs and firmware are often specified using source code written in a programming language, such as C. Modules, circuits, processors, programs, and computers can be specified at multiple levels of abstraction, for example, using the SystemC programming language, and have value as products in commerce as taxable goods under the Uniform Commercial Code (see U.C.C. Article 2, Part 1).

A program is transferred into one or more memories of the computer or computer system from a data and information device or storage system. A computer system typically has a device for reading storage media that is used to transfer the program, and/or has an interface device that receives the program over a network. This process is discussed in the General Computer Explanation section.

DETAILED DESCRIPTION—TECHNOLOGY SUPPORT GENERAL COMPUTER EXPLANATION

Figure 14A:
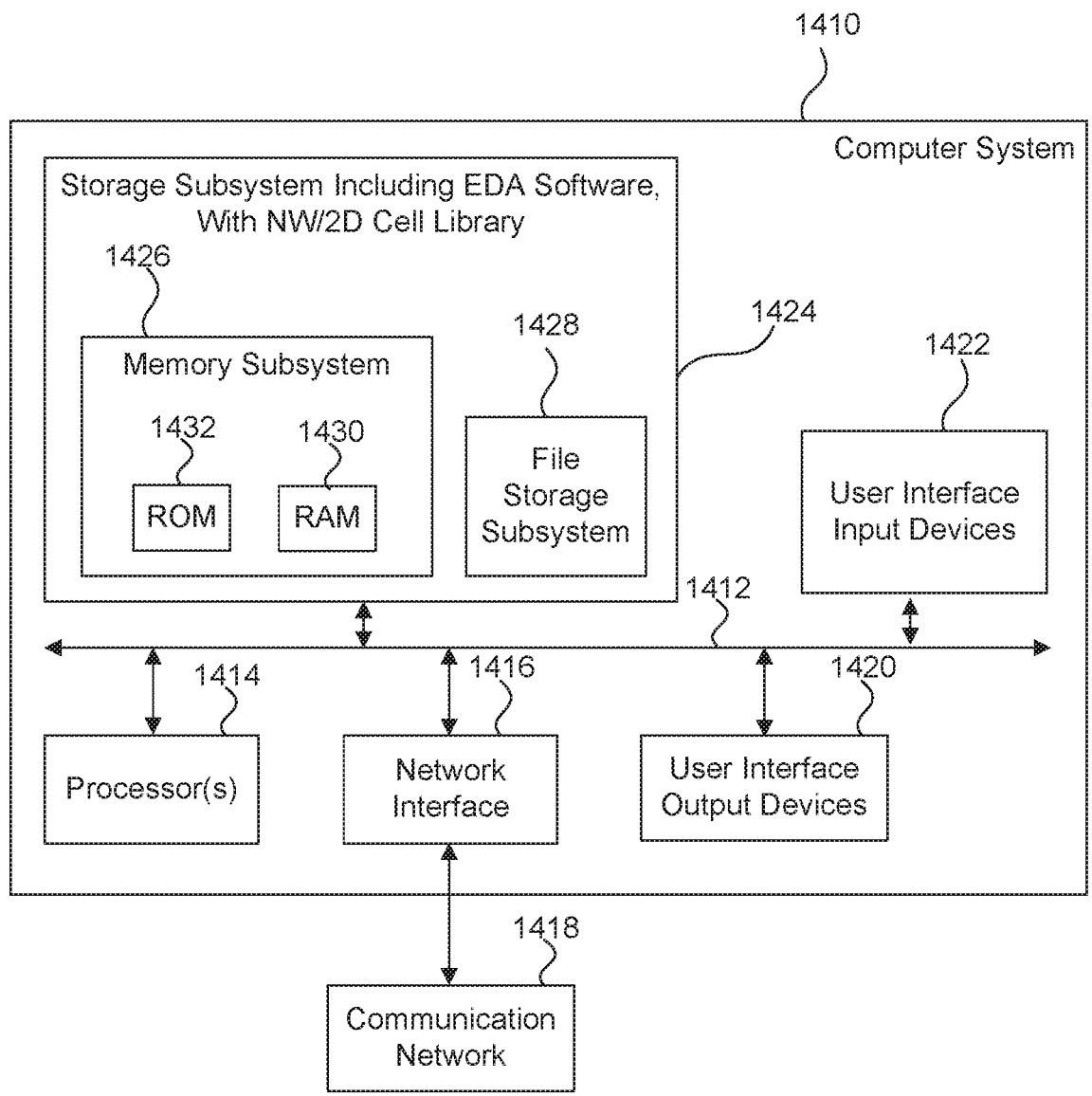
FIGS. 14A and 14B illustrate abstract diagrams of a computer system for use in commerce, if needed, by embodiments of the claimed inventions, as well as an embodiment of a circuit design and an embodiment of a manufactured circuit used in these claimed inventions.
Figure 14B:
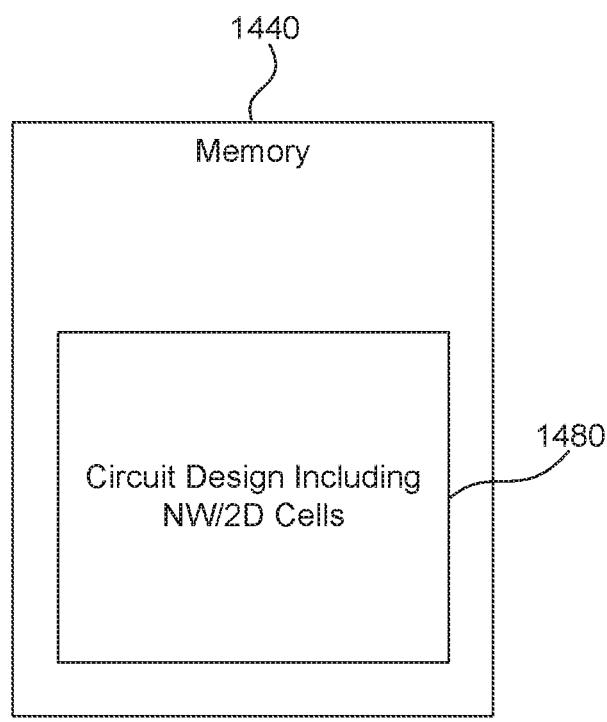

FIGS. 14A and 14B are abstract diagrams of a computer system suitable for enabling embodiments of the claimed inventions.

In FIG. 14A, the structure of computer system 1410 typically includes at least one computer 1414 which communicates with peripheral devices via bus subsystem 1412. Typically, the computer includes a processor (e.g., a microprocessor, graphics processing unit, or digital signal processor), or its electronic processing equivalents, such as an Application Specific Integrated Circuit ('ASIC') or Field Programmable Gate Array ('FPGA'). Typically, peripheral devices include a storage subsystem 1424, comprising a memory subsystem 1426 and a file storage subsystem 1428, user interface input devices 1422, user interface output devices 1420, and/or a network interface subsystem 1416. The input and output devices enable direct and remote user interaction with computer system 1410. The computer system enables significant post-process activity using at least one output device and/or the network interface subsystem.

The computer system can be structured as a server, a client, a workstation, a mainframe, a personal computer (PC), a tablet PC, a set-top box (STB), a personal digital assistant (PDA), a cellular telephone, a smartphone, a web appliance, a rack-mounted 'blade', a kiosk, a television, a game station, a network router, switch or bridge, or any data processing machine with instructions that specify actions to be taken by that machine. The term 'server', as used herein, refers to a computer or processor that typically performs processes for, and sends data and information to, another computer or processor.

A computer system typically is structured, in part, with at least one operating system program, such as Microsoft's Windows, Sun Microsystems's Solaris, Apple Computer's MacOs and iOS, Google's Android, Linux and/or Unix. The computer system typically includes a Basic Input/Output System (BIOS) and processor firmware. The operating system, BIOS and firmware are used by the processor to structure and control any subsystems and interfaces connected to the processor. Typical processors that enable these operating systems include: the Pentium, Itanium and Xeon processors from Intel; the Opteron and Athlon processors from Advanced Micro Devices; the Graviton processor from Amazon; the POWER processor from IBM; the SPARC processor from Oracle; and the ARM processor from ARM Holdings.

The claimed inventions and their embodiments are limited neither to an electronic digital logic computer structured with programs nor to an electronically programmable device. For example, the claimed inventions can use an optical computer, a quantum computer, an analog computer, or the like. Further, where only a single computer system or a single machine is signified, the use of a singular form of such terms also can signify any structure of computer systems or machines that individually or jointly use processes. Due to the ever-changing nature of computers and networks, the description of computer system 1410 depicted in FIG. 14A is intended only as an example. Many other structures of computer system 1410 have more or less components than the computer system depicted in FIG. 14A.

Network interface subsystem 1416 provides an interface to outside networks, including an interface to communication network 1418, and is coupled via communication network 1418 to corresponding interface devices in other computer systems or machines. Communication network 1418 can comprise many interconnected computer systems, machines and physical communication connections ('signified by links'). These communication links can be wireline links, optical links, wireless links (e.g., using the WiFi or Bluetooth protocols), or any other physical devices for communication of information. Communication network 1418 can be any suitable computer network, for example a wide area network such as the Internet, and/or a local-to-wide area network such as Ethernet. The communication network is wired and/or wireless, and many communication networks use encryption and decryption processes, such as is available with a virtual private network. The communication network uses one or more communications interfaces, which receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. Communication algorithms ('protocols') can be specified using one or communication languages, such as HTTP, TCP/IP, RTP/RTSP, IPX and/or UDP.

User interface input devices 1422 can include an alphanumeric keyboard, a keypad, pointing devices such as a mouse, trackball, toggle switch, touchpad, stylus, a graphics tablet, an optical scanner such as a bar code reader, touchscreen electronics for a display device, audio input devices such as voice recognition systems or microphones, eye-gaze recognition, brainwave pattern recognition, optical character recognition systems, and other types of input devices. Such devices are connected by wire or wirelessly to a computer system. Typically, the term 'input device' signifies all possible types of devices and processes to transfer data and information into computer system 1410 or onto communication network 1418. User interface input devices typically enable a user to select objects, icons, text and the like that appear on some types of user interface output devices, for example, a display subsystem.

User interface output devices 1420 can include a display subsystem, a printer, a fax machine, or a non-visual communication device such as audio and haptic devices. The display subsystem can include a cathode ray tube (CRT), a flat-panel device such as a liquid crystal display (LCD), an image projection device, or some other device for creating visible stimuli such as a virtual reality system. The display subsystem also can provide non-visual stimuli such as via audio output, aroma generation, or tactile/haptic output (e.g., vibrations and forces) devices. Typically, the term 'output device' signifies all possible types of devices and processes to transfer data and information out of computer system 1410 to the user or to another machine or computer system. Such devices are connected by wire or wirelessly to a computer system. Note: some devices transfer data and information both into and out of the computer, for example, haptic devices that generate vibrations and forces on the hand of a user while also incorporating sensors to measure the location and movement of the hand. Technical applications of the sciences of ergonomics and semiotics are used to improve the efficiency of user interactions with any processes and computers disclosed herein, such as any interactions with regards to the design and manufacture of circuits that use any of the above input or output devices.

Memory subsystem 1426 typically includes a number of memories including a main random-access memory ('RAM') 1430 (or other volatile storage device) for storage of instructions and data during program execution and a read only memory ('ROM') 1432 in which fixed instructions are stored. File storage subsystem 1428 provides persistent storage for program and data files, and can include a hard disk drive, a floppy disk drive along with associated removable media, a CD-ROM drive, an optical drive, a flash memory such as a USB drive, or removable media cartridges. If computer system 1410 includes an input device that performs optical character recognition, then text and symbols printed on paper can be used as a device for storage of program and data files. The databases and modules used by some embodiments can be stored by file storage subsystem 1428.

Bus subsystem 1412 provides a device for transmitting data and information between the various components and subsystems of computer system 1410. Although bus subsystem 1412 is depicted as a single bus, alternative embodiments of the bus subsystem can use multiple busses. For example, a main memory using RAM can communicate directly with file storage systems using Direct Memory Access ('DMA') systems.

FIG. 14B depicts a memory 1440 such as a non-transitory, processor readable data and information storage medium associated with file storage subsystem 1428, and/or with network interface subsystem 1416, and can include a data structure specifying a circuit design. The memory 1440 can be a hard disk, a floppy disk, a CD-ROM, an optical medium, removable media cartridge, or any other medium that stores computer readable data in a volatile or non-volatile form, such as text and symbols on paper that can be processed by an optical character recognition system. A program transferred in to and out of a processor from such a memory can be transformed into a physical signal that is propagated through a medium (such as a network, connector, wire, or circuit trace as an electrical pulse); or through a medium such as space or an atmosphere as an acoustic signal, or as electromagnetic radiation with wavelengths in the electromagnetic spectrum longer than infrared light).

DETAILED DESCRIPTION—TECHNOLOGY SUPPORT EDA SYSTEM/WORKFLOW EXPLANATION

Figure 13:
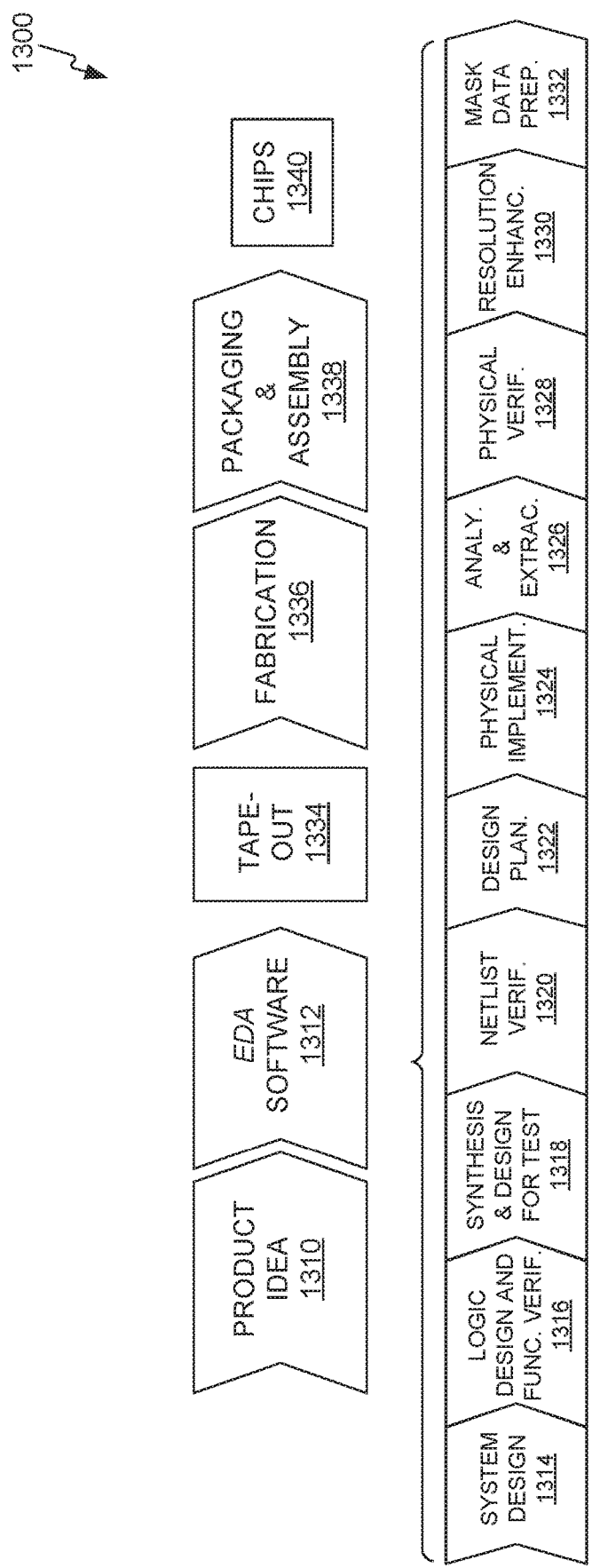
FIG. 13 illustrates a flow-chart of various processes used during the design and fabrication of an integrated circuit, according to an exemplary embodiments of the present disclosure.

FIG. 13 depicts a set of processes 1300 used during the design, verification and fabrication of an article of manufacture such as an integrated circuit to transform and verify design data and instructions that represent the integrated circuit. Each of these processes can be structured and enabled as multiple modules. The term 'EDA' signifies the term 'Electronic Design Automation'. These processes start with the creation of a product idea 1310 with information supplied by a designer, information which is transformed to create an article of manufacture that uses a set of EDA processes 1312. When the design is finalized, it is taped-out 1334, which typically is when artwork (e.g., geometric patterns) for the integrated circuit is sent to a fabrication facility to manufacture the mask set, which is then used to manufacture the integrated circuit. After tape-out, a semiconductor die is manufactured 1336 and packaging and assembly processes 1338 are performed to produce the finished integrated circuit 740.

Specifications for a circuit or electronic structure are as used in commerce at multiple levels of useful abstraction ranging from low-level transistor material layouts to high-level description languages. Most designers start with a description using one or more modules with less detail at a high-level of abstraction to design their circuits and systems, using a hardware description language ('HDL') such as VHDL, Verilog, SystemVerilog, SystemC, MyHDL or OpenVera. The high-level description is easier for designers to understand, especially for a vast system, and can describe very complex systems that are difficult to understand using a lower level of abstraction that is a more detailed description. The HDL description can be transformed into other levels of abstraction that are used by the developers. For example, a high-level description can be transformed to a logic-level register transfer level ('RTL') description, a gate-level description, a layout-level description, or a mask-level description. Each lower abstraction level that is a less abstract description adds more useful detail into the design description, for example, more details for the modules that comprise the description. The lower-levels of abstraction that are less abstract descriptions can be generated by a computer, derived from a design library, or created by another design automation process. An example of a specification language at a lower level of abstraction language for specifying more detailed descriptions is SPICE, which is much used for detailed descriptions of circuits with many analog components. A circuit specification for a circuit also has value as an article of manufacture in commerce as a good under the Uniform Commercial Code (see U.C.C. Article 2, Part 1). Descriptions at each level of abstraction are enabled for use by the corresponding tools of that layer (for example, a formal verification tool), and some of the modules of the abstractions need not be novel or unobvious.

A design process that uses EDA processes 1312 includes processes 1314 to 1332, which are described below. This design flow description is used only to illustrate, not to limit. For example, a designer of an integrated circuit design can use the design processes in a different sequence than the sequence depicted in FIG. 13. For the embodiments disclosed herein, products from Synopsys, Inc. of Mountain View, Calif. (hereinafter signified by 'Synopsys'), are used to enable these processes, and/or similar products from other companies.

During system design 1314, a designer specifies the functionality to be manufactured. The designer also can optimize the power, performance and area (physical and/or lines of code) and minimize costs, etc. Partitioning of the design into different types of modules can occur at this stage. Exemplary EDA products from Synopsys that enable system design 1314 include: the Model Architect, Saber, System Studio, and Designware products.

During logic design and functional verification 1316, modules in the circuit are specified in one or more description languages, and the specification is checked for functional accuracy, that is, that the modules produce outputs that match the requirements of the specification of the circuit or system being designed. Exemplary HDL languages are Verilog, VHDL and SystemC. Functional verification typically uses simulators and other programs such as test bench generators, static HDL checkers and formal verifiers. In some situations, special systems of modules referred to as 'emulators' or 'prototyping systems' are used to speed up the functional verification. Exemplary EDA products from Synopsys that can be used at this stage include: VCS, Vera, Designware, Magellan, Formality, ESP and Leda products. Exemplary emulator and prototyping products available from Synopsys that enable logic design and functional verification 1316 include: Zebu® and Protolink® (RTM signifies 'Registered Trademark').

During synthesis and design for test 1318, HDL code is transformed to a netlist (which typically is a graph structure where the edges represent components of a circuit and where the nodes represent how the components are interconnected). Both the HDL code and the netlist are hierarchical articles of manufacture that can be used by an EDA product to verify that the integrated circuit, when manufactured, performs according to its design. This netlist can be optimized for a target semiconductor manufacturing technology. Additionally, the finished integrated circuit is tested to verify that it satisfies the requirements of the specification. Exemplary EDA products from Synopsys that enable synthesis and design for test 718 include: the Design Compiler, Physical Compiler, Test Compiler, Power Compiler, FPGA Compiler, Tetramax, and Designware products.

During netlist verification 1320, the netlist is checked for compliance with timing constraints and for correspondence with the HDL code. Exemplary EDA products from Synopsys that enable netlist verification 1320 include: the Formality, Primetime, and VCS products.

During design planning 1322, an overall floor plan for the integrated circuit is constructed and analyzed for timing and top-level routing. Exemplary EDA products from Synopsys that enable design planning 1322 include: the Astro and IC Compiler products.

During layout implementation 1324, physical placement (positioning of circuit components such as transistors or capacitors) and routing (connection of the components by multiple conductors) occurs, and the selection of cells from a library to enable specific logic functions. As used herein, the term 'cell' signifies a set of transistors, other components, and interconnections that provides a Boolean logic function (e.g., AND, OR, NOT, XOR) or a storage function (such as a flipflop or latch). As used herein, a circuit 'block' comprises two or more cells. Both a cell and a circuit block can be referred to as a module, and are enabled as both physical structures and in simulations. Parameters are specified for selected cells (based on 'standard cells') such as size, and made accessible in a database for use by EDA products. Examples of databases that can be used for accessing cells include MySQL and PostgreSQL. Exemplary EDA products from Synopsys that enable layout implementation 724 include: the Astro and IC Compiler products.

During analysis and extraction 1326, the circuit function is verified at the layout level, which permits refinement of the layout design. Exemplary EDA products from Synopsys that enable analysis and extraction 726 include: the Astrorail, Primerail, Primetime, and Star RC/XT products.

During physical verification 1328, the layout design is checked to ensure that manufacturing constraints are correct, such as DRC constraints, electrical constraints, lithographic constraints, and that circuitry function matches the HDL design specification. Exemplary EDA products from Synopsys that enable physical verification 1328 include: the Hercules product.

During resolution enhancement 1330, the geometry of the layout is transformed to improve how the design is manufactured. Exemplary EDA products from Synopsys that enable resolution enhancement 1330 include: the Proteus product.

During tape-out, data is created to be used (after lithographic enhancements are applied if appropriate) for production of lithography masks. Example EDA products from Synopsys that enable tape-out include: the IC Compiler and Custom Designer products.

During mask-data preparation 1332, the 'tape-out' data is used to produce lithography masks that are used to produce finished integrated circuits. Exemplary EDA products from Synopsys that enable mask-data preparation 1332 include: the CATS family of products.

For all of the abovementioned EDA products, similar products from other EDA vendors, such as Cadence, Siemens, other corporate entities or various non-commercial products from universities, or open source repositories, can be used as an alternative.

A storage subsystem of a computer system (such as computer system 610 of FIG. 6A) is preferably used to store the programs and data structures that are used by some or all of the EDA products described herein, and products used for development of cells for the library and for physical and logical design that use the library.

DETAILED DESCRIPTION—SEMANTIC SUPPORT

The signifier 'commercial solution' signifies, solely for the following paragraph, an engineering domain-specific (and thus non-preemptive—see Bilski): electronic structure, a process for a specified machine, a manufacturable circuit (and their Church-Turing equivalents) or a composition of matter that applies science and/or technology for use in commerce to solve a technical problem.

The signifier 'abstract' (when used in a patent claim for any enabled embodiments disclosed herein for a new commercial solution that is a scientific use of one or more laws of nature {see Benson}, and that solves a problem of technology {see Diehr} for use in commerce—or improves upon an existing solution used in commerce {see Diehr})—is precisely defined by the inventor(s) {see MPEP 2111.01 (9th edition, Rev. 08.2017)} as follows:

a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is 'difficult to understand' {see Merriam-Webster definition for 'abstract' } how the commercial solution differs from equivalent prior art solutions; or b) a new commercial solution is 'abstract' if the existing prior art includes at least one analogous prior art solution {see KSR}, or the existing prior art includes at least two prior art publications that can be combined {see Alice} by a skilled person {often referred to as a 'PHOSITA', see MPEP 2141-2144 ($9^{th}$ edition, Rev. 08.2017)} to be equivalent to the new commercial solution, and is thus unpatentable under 35 U.S.C. 103, for example, because it is 'difficult to understand' how the new commercial solution differs from a PHOSITA-combination/-application of the existing prior art; or c) a new commercial solution is 'abstract' if it is not disclosed with a description that enables its praxis, either because insufficient guidance exists in the description, or because only a generic implementation is described {see Mayo} with unspecified components, parameters or functionality, so that a PHOSITA is unable to instantiate an embodiment of the new solution for use in commerce, without, for example, requiring special programming {see Katz} (or, e.g., circuit design) to be performed by the PHOSITA, and is thus unpatentable under 35 U.S.C. 112, for example, because it is 'difficult to understand' how to use in commerce any embodiment of the new commercial solution.

DETAILED DESCRIPTION—DEFINITIONS

As used herein, the semiotic function RUD(t, p1, p2, . . . ) signifies that a skilled person can obtain, if needed for progressing the useful arts, a reasonably useful definition of the signifier 't' that comprises the union of definitions of 't' in one or more U.S. Patents and U.S. Patent Applications 'p1', 'p2', etc. For example, 'RUD(substantially, 9532624)' signifies that a skilled person can obtain a reasonably useful definition of 'substantially' as it is defined in U.S. Pat. No. 9,532,624.

DEFINITIONS: RUD(substantially, 9532624).

DETAILED DESCRIPTION—CONCLUSION

The Detailed Description signifies in isolation the individual features, structures, functions, or characteristics described herein and any combination of two or more such features, structures, functions or characteristics, to the extent that such features, structures, functions or characteristics or combinations thereof are enabled by the Detailed Description as a whole in light of the knowledge and understanding of a skilled person, irrespective of whether such features, structures, functions or characteristics, or combinations thereof, solve any problems disclosed herein, and without limitation to the scope of the Claims of the patent. When an embodiment of a claimed invention comprises a particular feature, structure, function or characteristic, it is within the knowledge and understanding of a skilled person to use such feature, structure, function, or characteristic in connection with other embodiments whether or not explicitly described, for example, as a substitute for another feature, structure, function or characteristic.

In view of the Detailed Description, a skilled person will understand that many variations of the claimed inventions can be enabled, such as function and structure of elements, described herein while remaining in the domain of the claimed inventions. One or more elements of an embodiment can be substituted for one or more elements in another embodiment, as will be understood by a skilled person. Writings about embodiments signify their uses in commerce, thereby enabling other skilled people to similarly use in commerce.

This Detailed Description is fitly written to provide knowledge and understanding. It is neither exhaustive nor limiting of the precise structures described, but is to be accorded the widest scope consistent with the disclosed principles and features. A skilled person can enable many equivalent variations. Without limitation, any and all equivalents described, signified or Incorporated by Reference in this patent application are specifically Incorporated by Reference into the Detailed Description. In addition, any and all variations described, signified or Incorporated By Reference with respect to any one claimed invention and its embodiment also are included with all other claimed inventions and their embodiments. Any such variations include both currently known variations as well as future variations, for example any element used for enablement includes a future equivalent element that provides the same function, regardless of the structure of the future equivalent element.

It is intended that the domain of the set of claimed inventions and their embodiments be defined and judged by the following Claims and their equivalents. The Detailed Description includes the following Claims, with each Claim standing on its own as a separate claimed invention. The embodiments of the claimed inventions can have more structure and features than are explicitly specified in the claims.

What is claimed:

1. A system, comprising:
a memory configured to store operations; and
one or more processors configured to perform the operations, the operations comprising:
deriving a plurality of master library cells from a plurality of target library cells of a directional routing layer on an integrated circuit,
determining a plurality of route touch regions of a snapping region on a snapping pattern, wherein each route touch region of the plurality of route touch regions corresponds with a pin region of a master library cell of the plurality of master library cells,
inserting a plurality of repeaters using the plurality of master library cells at the plurality of route touch regions upon determining that a route goes through a route touch region of the plurality of route touch regions, wherein the plurality of repeaters are inserted based on pin locations of the plurality of repeaters on a plurality of snapping grids, and
removing a block between an inserted first repeater of the plurality of repeaters in a first snapping grid of the plurality of snapping grids and an inserted second repeater of the plurality of repeaters in a second snapping grid of the plurality of snapping grids by swapping the inserted first repeater to a target library cell of the plurality of target library cells according to a constraint between the inserted first repeater and the inserted second repeater, wherein the block between the inserted first repeater and the inserted second repeater is caused from the first snapping grid being different in size from the second snapping grid.

2. The system of claim 1, wherein the constraint comprises one of distance, equal routing length, or location, and wherein the operations further comprise:
creating pre-defined routes inside the plurality of master library cells, wherein the pre-defined routes are free from a design rule check (DRC) violation.

3. The system of claim 1, wherein the operations further comprise:
arranging input pins and output pins in a direction of the directional routing layer.

4. The system of claim 3, wherein the input pins, the output pins, and routing tracks are placed on a metal track layer.

5. The system of claim 3, wherein the input pins and the output pins are placed on a metal track layer, and routing tracks are placed on another metal track layer.

6. The system of claim 1, wherein for the deriving the plurality of master library cells, the operations further comprise:
determining direction of the plurality of target library cells; and
deriving the plurality of master library cells in the direction of the plurality of target library cells, wherein the master library cell of the derived plurality of master library cells comprises the pin region based on a plurality of pins on at least one target library cell of the plurality of target library cells.

7. The system of claim 1, wherein for the determining the plurality of route touch regions, the operations further comprise:
arranging the plurality of route touch regions in a snapping pattern, wherein the snapping pattern comprises at least one of a checkerboard and an array.

8. The system of claim 1, wherein for the removing the block, the operations further comprise:
cutting pre-defined routes at locations of input pins and output pins inside the target library cell.

9. The system of claim 1, wherein the repeater is a buffer or an inverted buffer.

10. The system of claim 1, wherein for the removing the block, the operations further comprise:
adding vias to connect pre-defined routes in one routing layer with input pins or output pins in another routing layer.

11. A method, comprising:
deriving a plurality of master library cells from a plurality of target library cells of a directional routing layer on an integrated circuit;
determining a plurality of route touch regions of a snapping region on a snapping pattern, wherein each route touch region of the plurality of route touch regions corresponds with a pin region of a master library cell of the plurality of master library cells;
inserting a plurality of repeaters using the plurality of master library cells at the plurality of route touch regions upon determining that a route goes through a route touch region of the plurality of route touch regions, wherein the plurality of repeaters are inserted based on pin locations of the plurality of repeaters on a plurality of snapping grids; and
removing a block between an inserted first repeater of the plurality of repeaters and an inserted second repeater of the plurality of repeaters by swapping the inserted first repeater to a target library cell of the plurality of target library cells according to a constraint between the inserted first repeater and the inserted second repeater, wherein the block between the inserted first repeater and the inserted second repeater is caused from the first snapping grid being different in size from the second snapping grid.

12. The method of claim 11, wherein the constraint comprises one of distance, equal routing length, or location, and the method further comprising:
creating pre-defined routes inside the plurality of master library cells, wherein the pre-defined routes are free from a design rule check (DRC) violation.

13. The method of claim 11, further comprising:
arranging input pins and output pins in a direction of the directional routing layer.

14. The method of claim 13, wherein the input pins, the output pins, and routing tracks are placed on a metal track layer.

15. The method of claim 13, wherein the input pins and the output pins are placed on a metal track layer, and routing tracks are placed on another metal track layer.

16. The method of claim 11, wherein the deriving the plurality of master library cells further comprises:
determining direction of the plurality of target library cells; and
deriving the plurality of master library cells in the direction of the plurality of target library cells, wherein the master library cell of the derived plurality of master library cells comprises the pin region based on a plurality of pins on at least one target library cell of the plurality of target library cells.

17. The method of claim 11, wherein the determining the plurality of route touch regions comprises arranging the plurality of route touch regions in a snapping pattern, wherein the snapping pattern comprises at least one of a checkerboard and an array.

18. The method of claim 11, wherein the removing the block comprises cutting pre-defined routes at locations of input pins and output pins inside the target library cell.

19. The method of claim 11, wherein the removing the block comprises adding vias to connect pre-defined routes in one routing layer with input pins or output pins in another routing layer.

20. A non-transitory, tangible computer-readable device having instructions stored thereon that, when executed by at least one computing device, cause the at least one computing device to perform operations comprising:
deriving a plurality of master library cells from a plurality of target library cells of a directional routing layer on an integrated circuit (IC);
determining a plurality of route touch regions of a snapping region on a snapping pattern, wherein each route touch region of the plurality of route touch regions corresponds with a pin region of a master library cell of the plurality of master library cells;
inserting a plurality of repeaters using the plurality of master library cells at the plurality of route touch regions upon determining that a route goes through a route touch region of the plurality of route touch regions, wherein the plurality of repeaters are inserted based on pin locations of the plurality of repeaters on a plurality of snapping grids; and
removing a block between an inserted first repeater of the plurality of repeaters and an inserted second repeater of the plurality of repeaters by swapping the inserted first repeater to a target library cell of the plurality of target library cells according to a constraint between the inserted first repeater and the inserted second repeater, wherein the block between the inserted first repeater and the inserted second repeater is caused from the first snapping grid being different in size from the second snapping grid, and wherein the constraint comprises one of distance, equal routing length, or location.

* * * * *